(12) United States Patent
Oks et al.

(10) Patent No.: US 12,511,497 B1
(45) Date of Patent: Dec. 30, 2025

(54) EMBEDDING-BASED LARGE LANGUAGE MODEL TUNING

(71) Applicant: Amazon Technologies, Inc., Seattle, WA (US)

(72) Inventors: Eduard Oks, Redmond, WA (US); Michael Dillon, Bainbridge Island, WA (US); Sharon Alpert, Kirkland, WA (US); Sepehr Valipour, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 209 days.

(21) Appl. No.: 18/525,449

(22) Filed: Nov. 30, 2023

(51) Int. Cl.
*G06F 40/47* (2020.01)
*G10L 15/22* (2006.01)
*G10L 15/30* (2013.01)

(52) U.S. Cl.
CPC .............. *G06F 40/47* (2020.01); *G10L 15/22* (2013.01); *G10L 15/30* (2013.01); *G10L 2015/223* (2013.01)

(58) Field of Classification Search
USPC ..................................................... 704/1–504
See application file for complete search history.

(56) References Cited

U.S. PATENT DOCUMENTS

| | | | |
|---|---|---|---|
| 11,355,112 B1 * | 6/2022 | Pahwa | G06F 3/167 |
| 12,067,362 B2 * | 8/2024 | Tunstall-Pedoe | G06N 3/0455 |
| 12,164,868 B2 * | 12/2024 | Tunstall-Pedoe | G06F 40/56 |
| 2023/0259705 A1 * | 8/2023 | Tunstall-Pedoe | G06N 3/0499 704/9 |
| 2023/0274086 A1 * | 8/2023 | Tunstall-Pedoe | G06F 16/3344 704/9 |
| 2023/0274089 A1 * | 8/2023 | Tunstall-Pedoe | G06F 40/40 704/2 |
| 2023/0274094 A1 * | 8/2023 | Tunstall-Pedoe | G06F 40/30 704/9 |
| 2023/0316006 A1 * | 10/2023 | Tunstall-Pedoe | G06N 3/0442 704/9 |
| 2024/0355064 A1 * | 10/2024 | Skrypnyk | G06T 17/20 |
| 2024/0371361 A1 * | 11/2024 | Thomas | G10L 15/16 |
| 2024/0386015 A1 * | 11/2024 | Crabtree | G06F 16/9024 |
| 2024/0386881 A1 * | 11/2024 | Wang | G10L 15/02 |
| 2024/0412720 A1 * | 12/2024 | Vasylyev | G06F 16/90332 |
| 2024/0428787 A1 * | 12/2024 | Namazifar | G06F 16/90332 |
| 2025/0103877 A1 * | 3/2025 | Martin | G06N 3/08 |
| 2025/0157464 A1 * | 5/2025 | Wu | G10L 15/183 |
| 2025/0173415 A1 * | 5/2025 | Maizels | H04R 1/028 |
| 2025/0258708 A1 * | 8/2025 | Crabtree | G06F 9/5027 |

\* cited by examiner

*Primary Examiner* — Marcus T Riley
(74) *Attorney, Agent, or Firm* — Nicholson De Vos Webster & Elliott LLP

(57) ABSTRACT

Systems and methods for embedding-based LLM tuning include generating a first embedding of received user input data and utilizing a translation model trained to associate user input with device names to generate a second embedding that differs at least in part from the first embedding. Reference embeddings corresponding to devices associated with user account data may be generated and a subset of the reference embeddings that satisfy a threshold similarity to the second embedding may be determined. A large language model (LLM) configured to determine a response to the user input data may utilize data for a subset of devices that correspond to the subset of the reference embeddings for performing speech processing.

20 Claims, 12 Drawing Sheets

EMBEDDING-BASED LARGE LANGUAGE MODEL TUNING

BACKGROUND

Devices, including voice interface devices, have become available. Some of these devices may be utilized to perform actions in environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
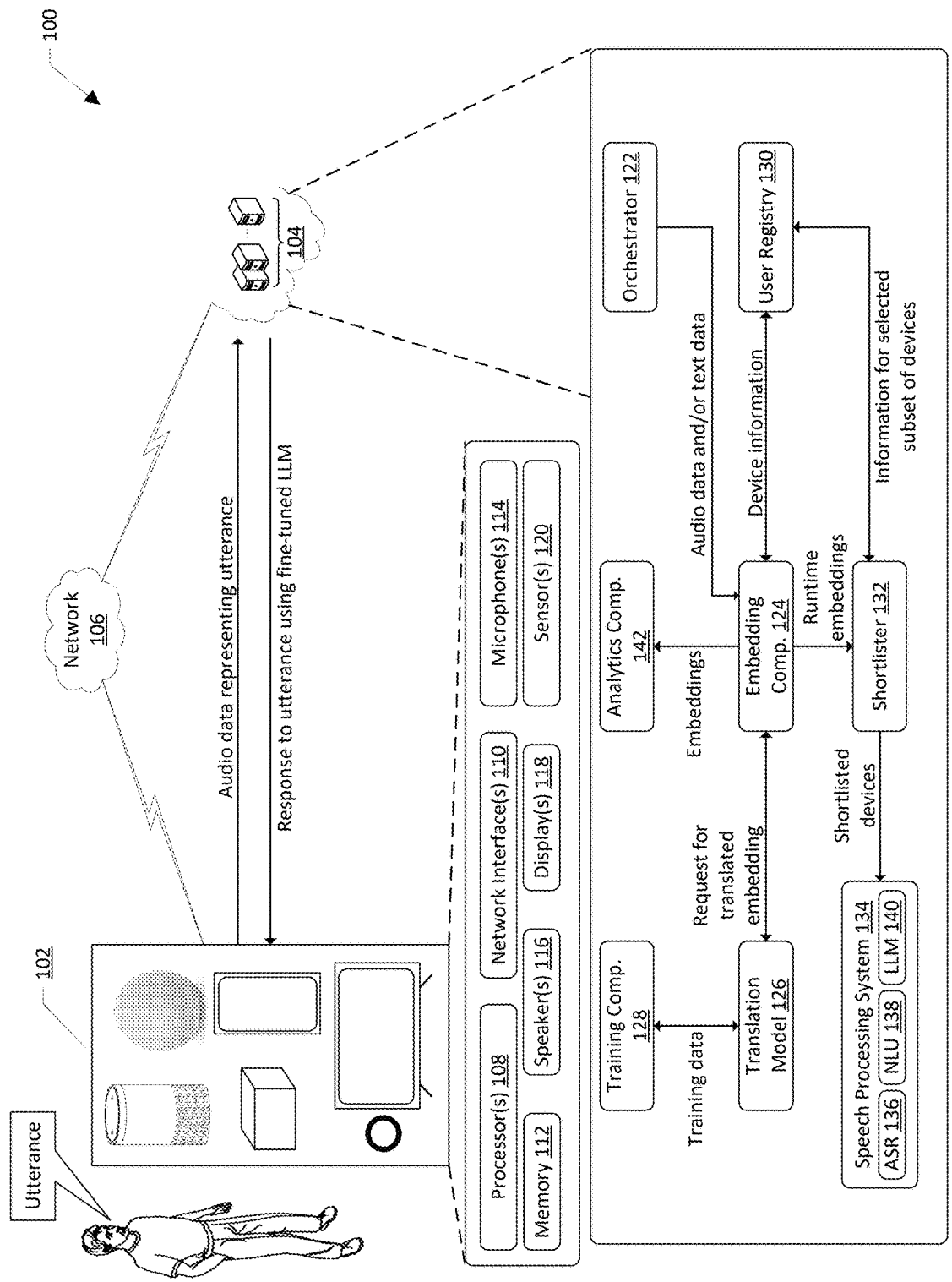
FIG. 1 illustrates a schematic diagram of an example environment for embedding-based large language model (LLM) tuning.

Systems and methods for embedding-based LLM tuning are disclosed, among other things. Take, for example, an environment (such as a space in and/or around a home, hotel, vehicle, office, store, restaurant, etc.) where one or more devices may be present. The devices may be utilized by one or more users or may otherwise be utilized to detect and/or control conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "home mode"), smart cameras (e.g., home security cameras), and/or touch interface devices (tablets, phones, steering wheels, laptops, kiosks, billboard, other devices with buttons, etc.). Some devices can be multiple types of those noted above.

In these and other scenarios, a speech processing system may be configured to receive audio data representing voice commands and to determine one or more actions to be performed and/or responses to be output that are responsive to the voice commands. To do so, in examples, the speech processing system may include a LLM that may receive, as input, audio data representing a given voice command (and/or text data representing the voice command) and may attempt to determine what action and/or response is intended from the voice command. By way of a nonlimiting example, a given voice command may be "turn the light green." In this example, the LLM may receive data representing the voice command and attempt to determine what action should be performed. Here, the LLM may determine that the action is associated with a given domain, such as a smart home domain in this example, and that the voice command is to cause a device to transition device states such that the device causes emission of green light. However, in at least some examples, determining which device should perform the action, which action should be performed, and/or other attributes associated with speech processing may be difficult for the LLM to perform, particularly when the options available to the LLM are voluminous or otherwise result in more action possibilities than the LLM is configured to handle. A specific example of this may be when a voice command is received in association with a user account that has 100 smart devices, each smart device being associated with various device state possibilities, routines, preferences, etc.

In these and other examples, it may be advantageous to fine tune the LLM such that it utilizes, as input when responding to a voice command, a subset of possible options for determining an action to be performed responsive to the voice command. By way of nonlimiting example, utilizing the systems and methods described herein, the LLM may be fine-tuned such that when a given voice command is received, a subset of devices associated with the user account are determined as being most likely to be associated with the voice command, and information associated with that subset of devices may be provided as input to the LLM for determining what action to perform responsive to the voice command. To achieve these and other benefits as described herein, embeddings of user utterances, devices, and/or other information such as application programming interfaces (APIs) may be generated and utilized to determine what information is most likely relevant to provide to the LLM during speech processing.

To do so, an embedding component of the system may be configured to generate several types of embeddings. First, the embedding component may be configured to generate utterance embeddings, which may be embeddings of user utterances that have been provided to the system. Second, the embedding component may be configured to generate device embeddings, which may be embeddings of device information for devices known to the system. The device information that may be embedded may include, by way of nonlimiting example, device names, device functionalities, device types, context data associated with devices, etc. Third, and in some examples, the embedding component may be configured to generate API embeddings, which may be embeddings of domain APIs indicating which domains and/or domain APIs may be utilized when a given user utterance is received and/or when a given device is utilized to perform an action responsive to a user utterance. As described in more detail below, these embeddings may be low-dimensional representations of the data from which they were generated. For example, for an utterance embedding, the utterance may be associated with text data indicating a textual representation of a voice command provided to the system. When embedded, the utterance embedding may represent the text data as a string of numbers or otherwise values instead of the text data itself. These embeddings may be represented as vectors in a vector space (otherwise referred to herein as an embedding space), and the vectors may be associated with a location in the vector space. Vectors that are nearer each other in the vector space may indicate similarities between the underlying data used to generate the vectors, while vectors that are farther apart may indicate divergent underlying data.

In addition to the generation of such embeddings, a translation model may be trained and utilized to translate the utterance embeddings into translated embeddings that are more closely related to the device embeddings. For example, a given utterance may be "please turn my bedroom light off." The utterance embedding generated from the utterance may be a low-dimensional representation of the words in the utterance, including information that is not specific to the device in question such as "please turn my" and "off." Another example may be an utterance of "it is dark in here, change that." In this example, none of the text data representing the utterance includes words that are explicitly associated with a device or otherwise device information, even though an action may have been performed by a device responsive to that utterance. To better associate utterances with devices, the translation model may be trained and utilized.

To train the translation model, in examples, prior utterances and devices utilized to perform prior actions responsive to those utterances may be used along with contrastive learning, in examples, to identify relationships between those prior utterances and devices. For example, utterance embeddings may be generated for the prior utterances, and device embeddings may be generated for the devices that performed actions responsive to those prior utterances. A training dataset may be generated based at least in part on the utterance embeddings and the device embeddings. A training component of the system may then utilize the training dataset along with, in examples, contrastive learning to determine how a given utterance embedding should be translated such that a resulting translated embedding of that utterance embedding is located relative to the device embedding of the device that performed an action responsive to that prior utterance. In doing so, the translation model may be trained to intake utterance embeddings and to generate translated embeddings that are more closely associated with the device embeddings than the untranslated versions of the utterance embeddings.

During runtime, with the translation model trained as described herein, data representing an utterance may be received, and an orchestrator of the system may determine whether the fine tuning processes described herein are to be utilized. For example, the user utterance may be associated with a user account with only a handful of smart devices. In this example, utilizing the embedding comparison processes described below may not be desirable at least in some examples. However, if the orchestrator determines that the number of devices associated with the account data in question satisfies a threshold number of devices and/or the or orchestrator determines that a number of variables (also described herein as tokens) to be provided to the LLM exceed a predefined number, the orchestrator may send the data representing the utterance to the embedding component. The embedding component may generate an utterance embedding for the utterance and may query a user registry for device information of devices associated with the user account in question. The embedding component may then utilize the device information to generate device embeddings (also described herein as reference embeddings in some examples) for some or all of the devices associated with the user account.

The embedding component may also send the utterance embedding to the translation model with a request for a translated embedding of that utterance embedding. The translation model may intake the utterance embedding and generate a translated embedding therefrom, which may be returned to the embedding component. The embedding component may then send the translated embedding of the utterance and the device embeddings to a shortlister, which may be configured to analyze the embeddings and determine how to parse the information associated with the embeddings to provide fine-tuned information to the LLM for further speech processing. In a given nonlimiting example, the shortlister may compare the translated embedding to the device embeddings to determine a subset of the device embeddings that are most similar to the translated embedding. As described in more detail below; the shortlister may utilize cosine similarity processes to determine which of the device embeddings are most similar to the translated embedding. In the context of an embedding space, a threshold distance from the translated embedding may be established, and device embeddings with locations within the threshold distance may be selected for the subset of device embeddings. In other examples, similarity scoring may be utilized to determine which device embeddings are associated with similarity scores that satisfy a threshold score.

Once the subset of device embeddings has been determined, the shortlister may request device information associated with devices corresponding to the device embeddings from the user registry. This device information may then be provided to components of a speech processing system, such as the LLM, for determining an action to be performed. By so doing, instead of providing the LLM with all of the device information for all of the devices associated with a given user account, a subset of the device information may be provided to the LLM for the devices that are most likely associated with the utterance in question. The LLM may then utilize that device information along with a representation of the utterance to determine what action should be performed responsive to the utterance and/or which device(s) should perform the action.

Additionally, or alternatively, the embedding component may also generate API embeddings associated with APIs that the LLM is configured to utilize for acquiring information to perform speech processing (among other processes). The shortlister may compare the translated utterance embedding with the API embeddings to determine which API embedding is most closely related to the utterance. The shortlister may provide this API-related information to the LLM, which may utilize such information to determine which API to utilize for acquiring information to respond to the given utterance.

Additionally, or alternatively, the embeddings described herein may be utilized to perform various analytics operations to improve embedding generation, embedding comparison, and/or speech processing. For example, an embedding space may be generated that includes utterance embeddings (including translated utterance embeddings), device embeddings, and/or API embeddings. The embedding space may then be analyzed to determine improvements that can be made for training the translation model and/or generating accurate runtime embeddings. By way of example, a group of utterance embeddings associated with the same or similar action and/or associated with a given device may be determined. Vectors of those utterance embeddings may be analyzed to determine if two or more such utterance embeddings have at least a threshold similarity to each other. In this case, the utterance embeddings may be considered duplicative and/or too closely related to be helpful and one or more of these embeddings may be removed or otherwise dissociated from the embedding space. In other examples, problematic utterances (or otherwise utterances where speech processing results were not favorable) may be determined and the translation model may be trained to translate an utterance embedding for the problematic utterance into a translated embedding that more closely aligns with the appropriate device embedding.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for embedding-based LLM tuning. The environment 100 may include, for example, devices 102. In certain examples, the devices 102 themselves may be any one or more of a voice interface device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In some examples, the devices may be situated in a home, place of business, healthcare facility (e.g., hospital, doctor's office, pharmacy, etc.), in a vehicle (e.g., airplane, truck, car, bus, etc.), and/or in a public forum (e.g., shopping center, store, hotel, etc.), for example. In some nonlimiting examples, at least some of the devices 102 may be multimodal devices that may be configured to capture audio representing user utterances and/or to capture user input by a display or otherwise.

The devices 102 may be configured to send data to and/or receive data from remote component(s) of a system 104, such as via a network 106. It should be understood that where operations are described herein as being performed by the remote component(s) of the system 104, some or all of those operations may be performed by the devices 102. It should also be understood that anytime the remote component(s) of the system 104 are referenced, that system may include any system and/or device, whether local to an environment of the devices or remote from that environment. Additionally, it should be understood that a given space and/or environment may include numerous devices. It should also be understood that when a "space" or "environment" is used herein, those terms mean an area of any size and delineation and can include but are not necessarily limited to a given room, building, or other structure, unless otherwise specifically described as such.

The devices 102 may include one or more components, such as, for example, one or more processors 108, one or more network interfaces 110, memory 112, one or more microphones 114, one or more speakers 116, one or more displays 118, and/or one or more sensors 120. The microphones 114 may be configured to capture audio, such as user utterances, and generate corresponding audio data. The speakers 116 may be configured to output audio, such as audio corresponding to audio data received from another device. The displays 118 may be configured to display images corresponding to image data, such as image data received from the remote component(s) of the system 104 as well as user interface elements that may be configured to receive user input indicating selection of such user interface elements. The devices 102 may be configured to detect an environmental condition associated with the environment utilizing the sensors 120. Some example sensors 120 that may be utilized to detect conditions may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors 120, usage data and/or account data may be utilized to determine if an environmental condition is present. In some examples, the sensors 120 may also include radar and/or ultrasonic sensors. The sensors 120 may be configured to generate context data as utilized herein.

It should be understood that while several examples used herein include a voice-enabled device that allows users to interact therewith via user utterances, one or more other devices, which may not include a voice interface, may be utilized instead of or in addition to voice-enabled devices. In these examples, the device 102 may be configured to send and receive data over the network 106 and to communicate with other devices in the environment 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The remote component(s) of the system 104 may include components such as, for example, an orchestrator 122, an embedding component 124, a translation model 126, a training component 128, a user registry 130, a shortlister 132, a speech processing system 134, and/or an analytics component 142. It should be understood that while the components of the remote component(s) of the system 104 are depicted and/or described as separate from each other in FIG. 1, some or all of the components may be a part of the same system. The speech processing system 134 may include an automatic speech recognition component (ASR) 136 and/or a natural language understanding component (NLU) 138 and/or a LLM 140. Each of the components described herein with respect to the remote component(s) of the system 104 may be associated with their own systems, which collectively may be referred to herein as the remote component(s) of the system 104, and/or some or all of the components may be associated with a single system. Additionally, the remote component(s) of the system 104 may include one or more applications, which may be described as skills. "Skills," as described herein may be applications and/or may be a subset of an application. For example, a skill may receive data representing an intent. For example, an intent may be determined by the NLU component 146 and/or as determined from user input via a computing device. Skills may be configured to utilize the intent to output data for input to a text-to-speech (TTS) component, a link or other resource locator for audio data, and/or a command to a device, such as smart devices. "Skills" may include applications running on devices, such as the smart devices, and/or may include portions that interface with voice user interfaces of smart devices.

In instances where a voice-enabled device is utilized, skills may extend the functionality of smart devices that can be controlled by users utilizing a voice-user interface. In some examples, skills may be a type of application that may be useable in association with target devices and may have been developed specifically to work in connection with given target devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

Additionally, the operations and/or functionalities associated with and/or described with respect to the components of the remote component(s) of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the remote component(s) of the system 104, the user registry 130 may be configured to determine and/or generate associations between users, user accounts, environment identifiers, and/or devices. For example, one or more associations between user accounts may be identified, determined, and/or generated by the user registry 130. The user registry 130 may additionally store information indicating one or more applications and/or resources accessible to and/or enabled for a given user account. Additionally, the user registry 130 may include information indicating device identifiers, such as naming identifiers, associated with a given user account, as well as device types associated with the device identifiers. The user registry 130 may also include information indicating user account identifiers, naming indicators of devices associated with user accounts, and/or associations between devices, such as the smart devices. The user registry 130 may also include information associated with usage of the smart devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the environment 100 may be stored or otherwise associated with an account identifier. Data associated with the user accounts may include, for example, account access information, historical usage data, device-association data, and/or preference data.

The speech-processing system 134 may be configured to receive audio data from the devices 102 and/or other devices and perform speech-processing operations. For example, the ASR component 136 may be configured to generate text data or other ASR output data corresponding to the audio data, and the NLU component 138 may be configured to generate intent data or other NLU output data corresponding to the audio data. In examples, intent data or other NLU output data may be generated that represents the audio data, such as without the generation and/or use of text data or other ASR output data. The intent data or other NLU output data may indicate a determined intent associated with the user utterance as well as a payload and/or value associated with the intent. For example, for a user utterance of "play Video A," the NLU component 138 may identify a "play" intent. In this example where the intent data or other NLU output data indicates an intent to output audio and/or images associated with Video A, the speech processing system 134 may call one or more applications to effectuate the intent. Skills, as described herein may otherwise be described as applications and may include functionality for utilizing intent data or other NLU output data to generate directives and/or instructions.

The components of the environment 100 are described below by way of example. To illustrate, the system 104 may be configured to receive audio data representing voice commands and to determine one or more actions to be performed and/or responses to be output that are responsive to the voice commands. To do so, in examples, the system 104 may receive, as input, audio data representing a given voice command (and/or text data representing the voice command) and may attempt to determine what action and/or response is intended from the voice command. By way of a nonlimiting example, a given voice command may be "turn the light green." In this example, the LLM 140 and/or other components of the speech processing system 134 may receive data representing the voice command and attempt to determine what action should be performed. Here, the LLM 140 and/or other components of the speech processing system 134 may determine that the action is associated with a given domain, such as a smart home domain in this example, and that the voice command is to cause a device to transition device states such that the device causes emission of green light. However, in at least some examples, determining which device should perform the action, which action should be performed, and/or other attributes associated with speech processing may be difficult for the speech processing system 134 to perform, particularly when the options available to the LLM 140 are voluminous or otherwise result in more action possibilities than the LLM 140 is configured to handle. A specific example of this may be when a voice command is received in association with a user account that has 100 smart devices, each smart device being associated with various device state possibilities, routines, preferences, etc.

In these and other examples, it may be advantageous to fine tune the LLM 140 such that it utilizes, as input when responding to a voice command, a subset of possible options for determining an action to be performed responsive to the voice command. By way of nonlimiting example, the LLM 140 may be fine-tuned such that when a given voice command is received, a subset of devices associated with the user account in question is determined as being most likely to be associated with the voice command, and information associated with that subset of devices may be provided as input to the LLM 140 for determining what action to perform responsive to the voice command. To achieve these and other benefits as described herein, embeddings of user utterances, devices, and/or other information such as APIs may be generated and utilized to determine what information is most likely relevant to provide to the LLM 140 and/or other components of the speech processing system 134 during speech processing.

To do so, the embedding component 124 may be configured to generate several types of embeddings. For example, the embedding component 124 may be configured to generate utterance embeddings, which may be embeddings of user utterances that have been provided to the system 104. Also, the embedding component 124 may be configured to generate device embeddings, which may be embeddings of device information for devices known to the system 104. The device information that may be embedded may include, by way of nonlimiting example, device names, device functionalities, device types, context data associated with devices, recency data indicating how recently a device has been configured for use or has otherwise been associated with a given user account, device group membership data indicating one or more groups of devices that the device in question belongs to, space information indicating one or more environments associated with the device (e.g., a kitchen space, an office space, etc.), etc. Furthermore, and in some examples, the embedding component 124 may be configured to generate API embeddings, which may be embeddings of domain APIs indicating which domains and/or domain APIs may be utilized when a given user utterance is received and/or when a given device is utilized to perform an action responsive to a user utterance. These embeddings may be low-dimensional representations of the data from which they were generated. For example, for an utterance embedding, the utterance may be associated with text data indicating a textual representation of a voice command provided to the system 104. When embedded, the utterance embedding may represent the text data as a string of numbers or otherwise values instead of the text data itself. These embeddings may be represented as vectors in a vector space, and the vectors may each be associated with a location in the vector space. Vectors that are nearer each other in the vector space may indicate similarities between the underlying data used to generate the vectors, while vectors that are farther apart may indicate divergent underlying data.

It should be understood that the embeddings described herein may include more than utterance embeddings, device embeddings, and/or API embeddings. In examples, the embeddings may be associated with groups of devices, endpoints that are not necessarily devices (including virtual endpoints), scenes, spaces, environments, routine identifiers, and/or any other identifier that may be utilized during speech processing to determine an action to be performed when user input is received.

With respect to embedding generation, for example, an utterance transcription (which may be the same as or similar to a textual representation of the voice command as described herein) may be received at the embedding component 124. In other examples, a representation of non-audio input and/or non-speech audio input may be received. One or more recurrent neural networks (RNNs) may receive the utterance transcription and may map input information (e.g., the utterance transcription) from a high-dimensional space to a lower-dimensional space. This may allow the RNNs to determine relationships between the inputs it receives to process data more efficiently. By way of example in speech processing, instead of using high-dimensional vectors, the RNNs may map individual words from the utterance transcription to a low-dimensional vector, where each dimension may represent a particular feature of the word in question. From there, the RNNs may send the output from their processes to one or more feed forward layers. The feed forward layers may be configured to intake the output from the RNNs and to generate the embedding in question. The result of the embedding process may be a low-dimensional representation of the utterance transcription that has less storage needs and represents a vector value that may be associated with an embedding space. Generally, embeddings may have less storage requirements than unembedded versions of data utilized to generate the embeddings. A similar process may be performed for the device embeddings, the API embeddings, and/or any other embeddings to be associated with the utterance embeddings.

In addition to the generation of such embeddings, the translation model 126 may be trained and utilized to translate the utterance embeddings into translated embeddings that are more closely related to the device embeddings. For example, a given utterance may be "please turn my bedroom light off." The utterance embedding generated from the utterance may be a low-dimensional representation of all of the words in the utterance, including information that is not specific to the device in question such as "please turn my" and "off." Another example may be an utterance of "it is dark in here, change that." In this example, none of the text data representing the utterance includes words that are explicitly associated with a device or otherwise device information, even though an action may have been performed by a device responsive to that utterance. To better associate utterances with devices, the translation model 126 may be trained and utilized.

To train the translation model 126, in examples, prior utterances and devices utilized to perform prior actions responsive to those utterances may be utilized along with contrastive learning, in examples, to identify relationships between those prior utterances and devices. For example, utterance embeddings may be generated for the prior utterances, and device embeddings may be generated for the devices that performed actions responsive to those prior utterances. A training dataset may be generated by the training component 128 based at least in part on the utterance embeddings and the device embeddings. The training component 128 may then utilize the training dataset along with, in examples, contrastive learning to determine how a given utterance embedding should be translated such that a resulting translated embedding of that utterance embedding is located relative to the device embedding of the device that performed an action responsive to that prior utterance. The contrastive learning may include, by way of example, leveraging identifications of similarities and dissimilarities between embeddings to map similar instances of embeddings closer together than less similar instances while causing dissimilarities to be mapped apart from each other. These mappings may be performed even in instances where the underlying embeddings are unlabeled or otherwise not identified as positive or negative in the dataset at issue. In doing so, the translation model 126 may be trained to intake utterance embeddings and to generate translated embeddings of those utterances that are more closely associated with the device embeddings that the untranslated versions of the utterance embeddings.

During runtime, with the translation model 126 trained as described herein, data representing an utterance may be received, and the orchestrator 122 may determine whether the fine tuning processes described herein are to be utilized. For example, the user utterance may be associated with a user account with only a handful of smart devices. In this example, utilizing the embedding comparison processes described below may not be desirable at least in some examples. However, if the orchestrator 122 determines that the number of devices associated with the account data in question satisfies a threshold number of devices and/or the or orchestrator 122 determines that a number of variables (also described herein as tokens) to be provided to the LLM 140 exceed a predefined number, the orchestrator 122 may send the data representing the utterance to the embedding component 124. The embedding component 124 may generate an utterance embedding for the utterance and may query the user registry 130 for device information of devices associated with the user account in question. The embedding component 124 may then utilize the device information to generate device embeddings (also described herein as reference embeddings in some examples) for some or all of the devices associated with the user account.

The embedding component 124 may also send the utterance embedding to the translation model 126 with a request for a translated embedding of that utterance embedding. The translation model 126 may intake the utterance embedding and generate a translated embedding therefrom, which may be returned to the embedding component 124. The embedding component 124 may then send the translated embedding of the utterance and the device embeddings to the shortlister 132, which may be configured to analyze the embeddings and determine how to parse the information associated with the embeddings to provide fine-tuned information to the LLM 140 for further speech processing. In a given non-limiting example, the shortlister 132 may compare the translated embedding to the device embeddings to determine a subset of the device embeddings that are most similar to the translated embedding. The shortlister 132 may utilize cosine similarity processes to determine which of the device embeddings are most similar to the translated embedding. In the context of an embedding space, a threshold distance from the translated embedding may be established, and device embeddings with locations within the threshold distance may be selected for the subset of device embeddings. In other examples, similarity scoring may be utilized to determine which device embeddings are associated with similarity scores that satisfy a threshold score. In should be understood that other comparison schemes may be utilized than those described by way of example herein, and generally this disclosure includes the comparison of the translated embedding to the reference embeddings to determine which reference embeddings are most similar to the translated embedding.

Once the subset of device embeddings has been determined, the shortlister 132 may request device information associated with devices corresponding to the device embeddings from the user registry 130. This device information may then be provided to components of the speech processing system 134, such as the LLM 140, for determining an action to be performed. By so doing, instead of providing the LLM 140 with all of the device information for all of the devices associated with a given user account, a subset of the device information may be provided to the LLM 140 for the devices that are most likely associated with the utterance in question. The LLM 140 may then utilize that device information along with a representation of the utterance to determine what action should be performed responsive to the utterance and/or which device(s) should perform the action.

Additionally, or alternatively, the embedding component 124 may also generate API embeddings associated with APIs that the LLM 140 is configured to utilize for acquiring information to perform speech processing (among other processes). The shortlister 132 may compare the translated utterance embedding with the API embeddings to determine which API embedding is most closely related to the utterance. The shortlister 132 may provide this API-related information to the LLM 140, which may utilize such information to determine which API to utilize for acquiring information to respond to the given utterance.

Additionally, or alternatively, the embeddings described herein may be utilized to perform various analytics operations to improve embedding generation, embedding comparison, and speech processing. For example, the analytics component 142 may generate an embedding space that includes utterance embeddings (including translated utterance embeddings), device embeddings, and/or API embeddings. The embedding space may then be analyzed by the analytics component 142 to determine improvements that can be made for training the translation model 126 and/or generating accurate runtime embeddings. By way of example, a group of utterance embeddings associated with the same or similar action and/or associated with a given device may be determined. Vectors of those utterance embeddings may be analyzed to determine if two or more such utterance embeddings have at least a threshold similarity to each other. In this case, the utterance embeddings may be considered duplicative and/or too closely related to be helpful and one or more of these embeddings may be removed from the embedding space. In other examples, problematic utterances (or otherwise utterances where speech processing results were not favorable) may be determined and the translation model 126 may be trained to translate an utterance embedding for the problematic utterance into a translated embedding that more closely aligns with the appropriate device embedding.

As used herein, the one or more processes performed by the device 102 and/or the remote component(s) of the system 104 may include the use of models. These models may be machine learning models. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning. sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with prior user input data. The models may be trained for multiple user accounts and/or for a specific user account. As such, the machine learning models may be configured to learn, without human intervention, attributes of collected data and/or actions taken associated with device usage cessation.

It should be noted that while text data or other ASR output data is described as a type of data utilized to communicate between various components of the remote component(s) of the system 104 and/or other systems and/or devices, the components of the remote component(s) of the system 104 may use any suitable format of data to communicate. For example, the data may be in a human-readable format, such as text data or other ASR output data formatted as XML, SSML, and/or other markup language, or in a computer-readable format, such as binary, hexadecimal, etc., which may be converted to text data or other ASR output data for display by one or more devices such as the devices.

As shown in FIG. 1, several of the remote component(s) of the system 104 and the associated functionality of those components as described herein may be performed by one or more of the devices 102. Additionally, or alternatively, some or all of the components and/or functionalities associated with the devices 102 may be performed by the remote component(s) of the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory 112 and/or the memory described with respect to the components of the system 104 may include volatile and nonvolatile memory, removable and non-removable media implemented in any method or technology for storage of information, such as non-transitory computer-readable instructions, data structures, program component, or other data. Such memory 112 and/or the memory described with respect to the components of the system 104 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the system 104 may be implemented as computer-readable storage media ("CRSM"), which may be any available physical media accessible by the processor(s) 108 and/or the processor(s) described with respect to the system 104 to execute instructions stored on the memory 112 and/or the memory described with respect to the components of the system 104.

In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

The network interface(s) 110 and/or the network interface(s) described with respect to the components of the system 104 may enable messages between the components and/or devices shown in environment 100 and/or with one or more other polling systems, as well as other networked devices. Such network interface(s) 110 and/or the network interface(s) described with respect to the components of the system 104 may include one or more network interface controllers (NICs) or other types of transceiver devices to send and receive messages over the network 106.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the remote component(s) of the system 104 may be local to an environment associated the devices. For instance, the remote component(s) of the system 104 may be located within one or more of the first user devices 102 and/or the smart devices. In some instances, some or all of the functionality of the remote component(s) of the system 104 may be performed by one or more of the devices. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
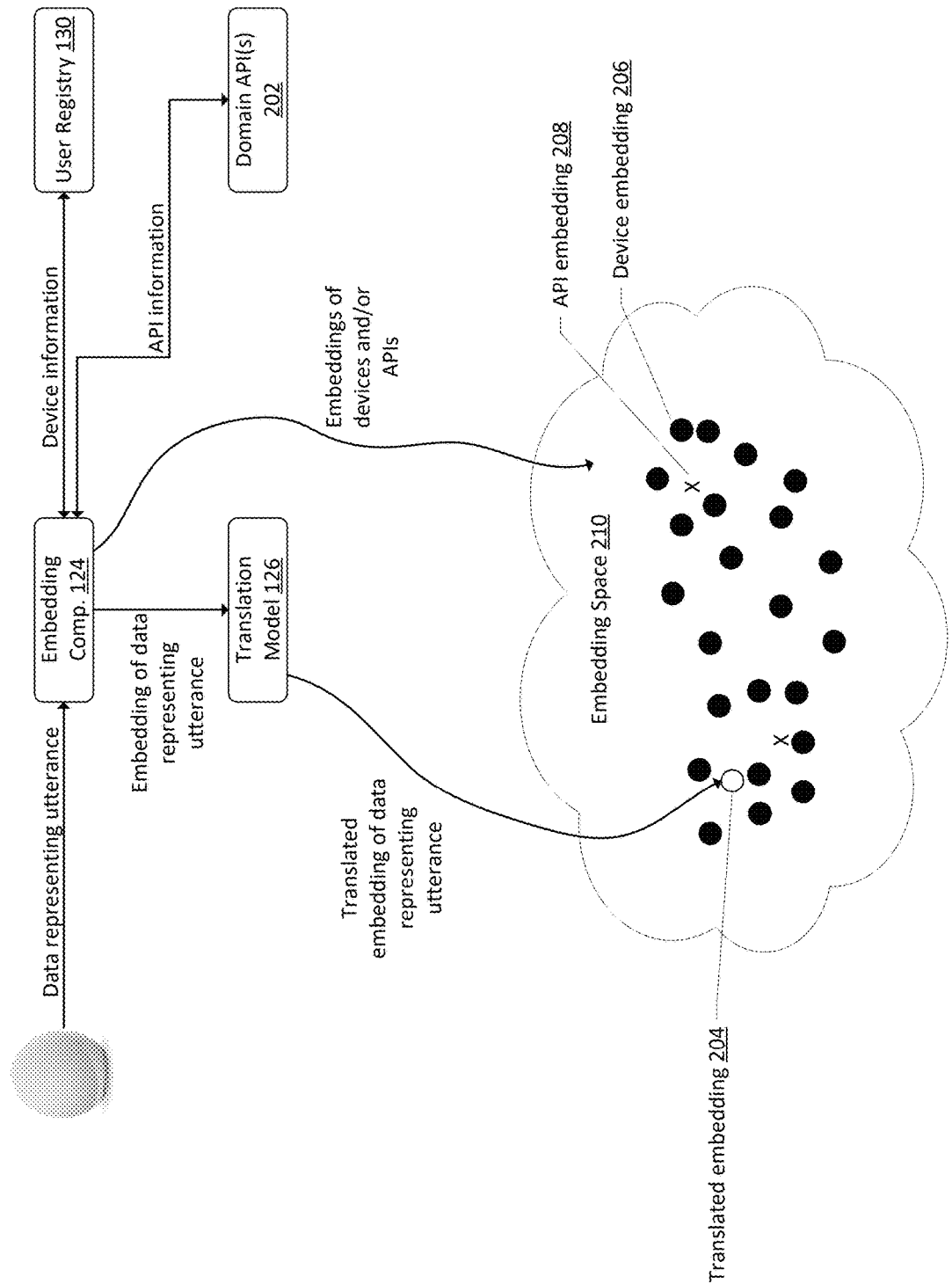
FIG. 2 illustrates a conceptual diagram of components utilized to generate utterance embeddings, device embeddings, and application programming interface (API) embeddings.

FIG. 2 illustrates a conceptual diagram of components utilized to generate utterance embeddings, device embeddings, and API embeddings. FIG. 2 may include at least some of the same or similar components as described with respect to FIG. 1. For example, FIG. 2 may include a device 102 that may receive an utterance, an embedding component 124, a translation model 126, and/or a user registry 130. FIG. 2 may also include one or more domain APIs 202, translated utterance embeddings 204, device embeddings 206, API embeddings 208, and/or an embedding space 210. These components will be described in detail below by way of nonlimiting example.

For example data representing an utterance may be received from a device 102 at remote components of a system, such as the embedding component 124. The embedding component 124 may generate an utterance embedding. In the example of FIG. 2, the utterance embedding is shown in the embedding space 210 as a white circle. The embedding component 124 may also query the user registry 130 for device information of devices associated with the user account in question. The embedding component 124 may then utilize the device information to generate device embeddings 206 (also described herein as reference embeddings in some examples) for some or all of the devices associated with the user account.

The embedding component 124 may also send the utterance embedding to the translation model 126 with a request for a translated embedding 204 of that utterance embedding. The translation model 126 may intake the utterance embedding and generate a translated embedding 204 therefrom, which may be returned to the embedding component 124. The embedding component 124 may then send the translated embedding 204 of the utterance and the device embeddings 206 to a shortlister, which may be configured to analyze the embeddings 204, 206 and determine how to parse the information associated with the embeddings 204, 206 to provide fine-tuned information to speech processing components such as a LLM for further speech processing. In a given nonlimiting example, the shortlister may compare the translated embedding 204 to the device embeddings 206 to determine a subset of the device embeddings 206 that are most similar to the translated embedding. The shortlister may utilize cosine similarity processes to determine which of the device embeddings 206 are most similar to the translated embedding 204. In the context of an embedding space, a threshold distance from the translated embedding 204 may be established, and device embeddings 206 with locations within the threshold distance may be selected for the subset of device embeddings 206. In other examples, similarity scoring may be utilized to determine which device embeddings 206 are associated with similarity scores that satisfy a threshold score. In should be understood that other comparison schemes may be utilized than those described by way of example herein, and generally this disclosure includes the comparison of the translated embedding 204 to the reference embeddings to determine which reference embeddings are most similar to the translated embedding.

Additionally, or alternatively, the embedding component 124 may also generate API embeddings 208 associated with APIs that the LLM is configured to utilize for acquiring information to perform speech processing (among other processes). For example, the embedding component 124 may query the domain APIs 202 for information that identifies the domain APIs 202. The embedding component 124 may then utilize the information returned from the domain APIs 202 to generate the API embeddings 208 that may be provided to the shortlister. The shortlister may compare the translated utterance embedding 204 with the API embeddings 208 to determine which API embedding 208 is most closely related to the utterance. The shortlister may provide this API-related information to the LLM, which may utilize such information to determine which API to utilize for acquiring information to respond to the given utterance.

As shown in FIG. 2, the embedding space 210 may associate the translated embedding 204 with the device embeddings 206 and/or the API embeddings 208. As shown in the embedding space 210, some of the device embeddings 206 are nearer to the translated utterance embedding 204 and thus may be candidates for the subset of device embeddings 206 to be selected. Additionally, one of the two example API embeddings 208 is nearer to the translated embedding 204 and thus is more likely to be selected than the API embedding 208 that is farther from the translated embedding 204.

FIGS. 3-6 illustrate processes for embedding-based LLM tuning. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, and 7-12, although the processes may be implemented in a wide variety of other environments, architectures and systems.

Figure 3:
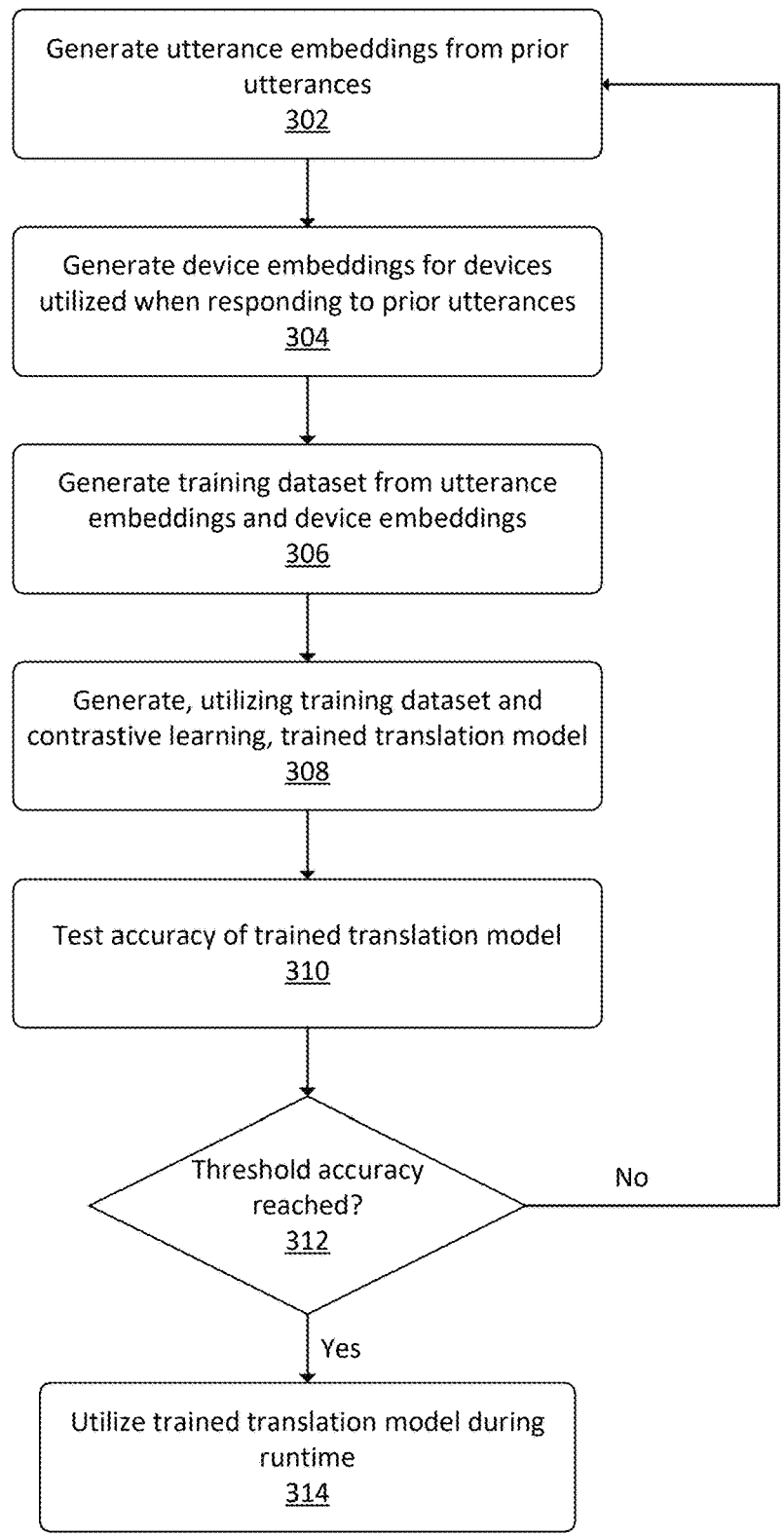
FIG. 3 illustrates a flow diagram of an example process for training a translation model to translate utterance embeddings to translated embeddings that correspond to device embeddings.

FIG. 3 illustrates a flow diagram of an example process 300 for training a translation model to translate utterance embeddings to translated embeddings that correspond to device embeddings. The order in which the operations or steps are described is not intended to be construed as a limitation, and any number of the described operations may be combined in any order and/or in parallel to implement process 300.

At block 302, the process 300 may include generating utterance embeddings from prior utterances. For example, the translation model described herein may be trained and utilized to translate the utterance embeddings into translated embeddings that are more closely related to the device embeddings. To train the translation model, in examples, prior utterances and devices utilized to perform prior actions responsive to those utterances may be utilized along with contrastive learning, in examples, to identify relationships between those prior utterances and devices. For example, utterance embeddings may be generated for the prior utterances. These utterance embeddings may be generated utilizing an embedding component as described herein.

At block 304, the process 300 may include generating device embeddings for devices utilized when responding to prior utterances. For example, device embeddings may be generated by the embedding component for the devices that performed actions responsive to those prior utterances. The system may store data indicating what action was performed and by which device for a given utterance. The system may also store data indicating whether the selected action and/or device was determined to be a correct response to the utterance in question.

At block 306, the process 300 may include generating a training dataset from the utterance embeddings and the device embeddings. For example, a training dataset may be generated by a training component based at least in part on the utterance embeddings and the device embeddings. The training dataset may indicate the utterance embedding, the device embedding, and a relationship between the two embeddings indicating that they are related. The training dataset may also include a host of negative training data which indicates that one or more utterance embeddings are not to be associated with a given device embedding, and/or that one or more device embeddings are not to be associated with a given utterance embedding.

At block 308, the process 300 may include generating, utilizing the training dataset and contrastive learning processes, a trained translation model. For example, the training component may then utilize the training dataset along with, in examples, contrastive learning to determine how a given utterance embedding should be translated such that a resulting translated embedding of that utterance embedding is located relative to the device embedding of the device that performed an action responsive to that prior utterance. The contrastive learning may include, by way of example, leveraging identifications of similarities and dissimilarities between embeddings to map similar instances of embeddings closer together than less similar instances while causing dissimilarities to be mapped apart from each other. These mappings may be performed even in instances where the underlying embeddings are unlabeled or otherwise not identified as positive or negative in the dataset at issue. In doing so, the translation model may be trained to intake utterance embeddings and to generate translated embeddings of those utterances that are more closely associated with the device embeddings that the untranslated versions of the utterance embeddings.

At block 310, the process 300 may include testing the accuracy of the trained translation model. For example, the trained translation model may be deployed in a test environment where controlled utterance for which a known device target is identified may be used. The embedding component may generate utterance embeddings from these utterances and the trained translation model may attempt to generate translated utterances. Distances between the translated utterances and the known device embeddings associated therewith may be determined.

At block 312, the process 300 may include determining whether the accuracy of the trained translation model satisfies a threshold accuracy. For example, when the trained translation model is accurately translating the utterance embeddings, the distances between translated embeddings and their respective device embeddings may satisfy a threshold distance. However, when the translated embeddings are not sufficiently close to the respective device embeddings, this may indicate that further training of the translation model may be desirable.

In examples where the accuracy does not satisfy the threshold accuracy, the process 300 may return to block 302 where additional utterance embeddings and device embeddings may be generated for additional prior utterances. This may result in the generation of additional training dataset, which may be utilized to retrain the translation model. The results of prior testing may also be utilized to further retrain the translation model.

In examples where the accuracy satisfies the threshold accuracy, the process 300 may include, at block 314, utilizing the trained translation model during runtime to determine what devices and/or other information is most likely relevant to a given user utterance. For example, in a given nonlimiting example, the system may compare the translated embedding to the device embeddings in a given runtime scenario to determine a subset of the device embeddings that are most similar to the translated embedding. The system may utilize cosine similarity processes to determine which of the device embeddings are most similar to the translated embedding. In the context of an embedding space, a threshold distance from the translated embedding may be established, and device embeddings with locations within the threshold distance may be selected for the subset of device embeddings.

Figure 4:
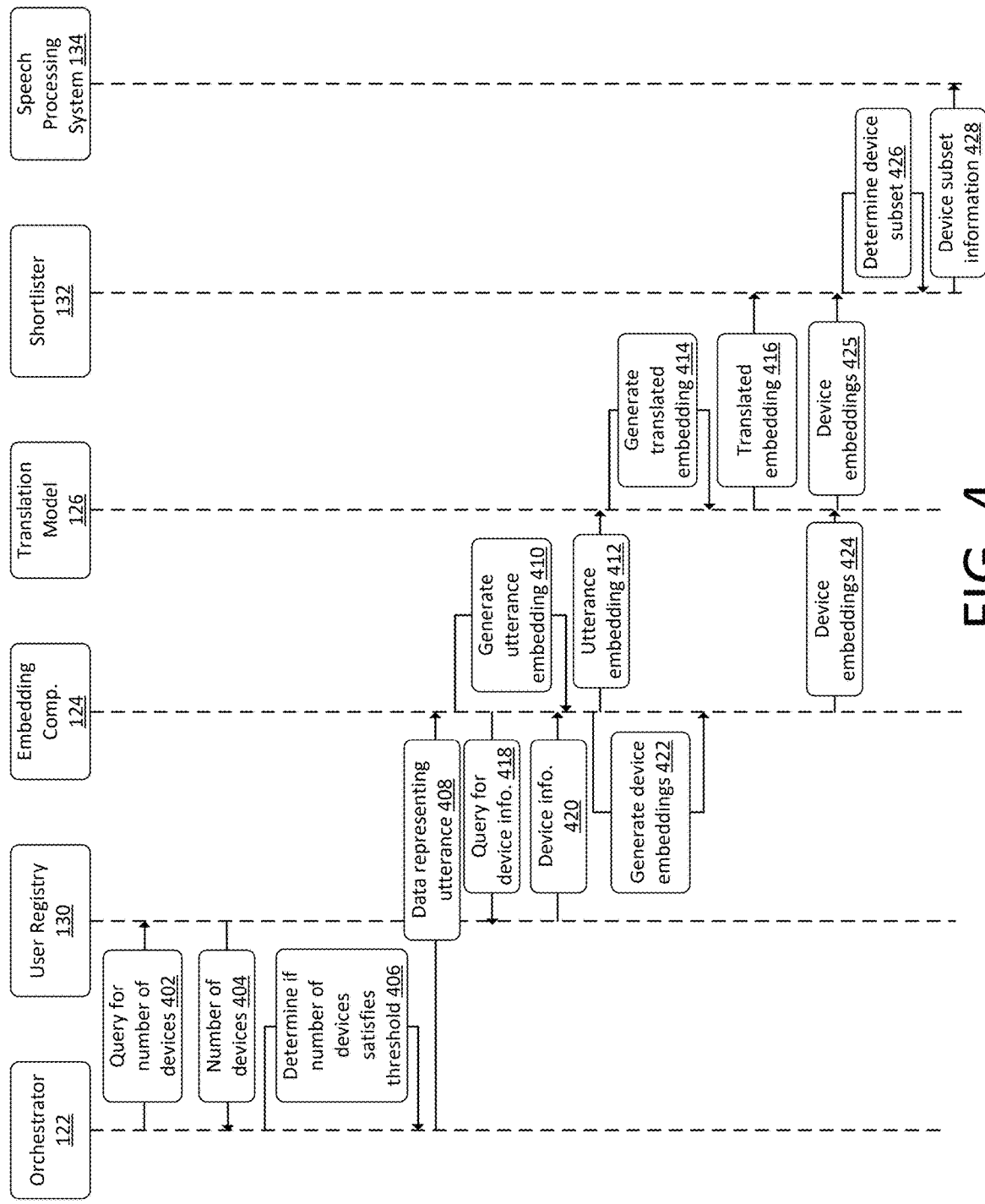
FIG. 4 illustrates a sequence diagram of an example process for generating and utilizing embeddings at runtime to shortlist a subset of devices.

FIG. 4 illustrates a sequence diagram of an example process for generating and utilizing embeddings at runtime to shortlist a subset of devices. The order in which the operations or steps are described is not intended to be construed as a limitation, and any number of the described operations may be combined in any order and/or in parallel to implement process 400. FIG. 4 may utilize at least some of the components described with respect to FIG. 1, including for example an orchestrator 122, a user registry 130, an embedding component 124, a translation model 126, a shortlister 132, and/or a speech processing system 134.

At block 402, the orchestrator 122 may query the user registry 130 for a number of devices associated with a user account in question. For example, the user registry 130 may include information known about a given user account associated with a user utterance. The information may include information about users associated with the user account as well as devices associated with the user account. The number of devices may be ascertained from the information stored in the user registry 130.

At block 404, the user registry 130 may return the number of devices associated with the user account. For example, the user registry 130 may be parsed to determine how many devices are associated with the user account and/or which devices are operable by the systems described herein. Utilizing a smart home utterance as an example, the utterance may be associated with a portion of all available devices associated with the user account, and/or only a portion of the devices may be in communication with the system.

At block 406, the orchestrator 122 may determine if the number of devices as returned by the user registry 130 satisfies a threshold number of devices. For example, the LLM described herein may be configured to utilize a certain number of tokens as input when determining a response to and/or an action to be performed or a given utterance. The number of tokens may be associated with a given number of devices to be considered as potential target devices and/or actions that may be performed by those devices. The threshold number of devices may be set based at least in part on the number of tokens usable by the LLM. In examples, the LLM may become more and more robust over time or otherwise may be capable of intaking more and more tokens during analysis. As such, in these examples, the threshold number of devices may be dynamic.

At block 408, the orchestrator 122 may send data representing the utterance to the embedding component 124. For example, a device may capture audio representing an utterance by a user. The device may generate audio data and may send data representing the utterance to the embedding component 124. The data representing the utterance may be the audio data, a textual representation of the audio data, at least partially processed speech results, and/or any other data associated with the utterance.

At block 410, the embedding component 124 may generate an utterance embedding utilizing the data representing the utterance. With respect to embedding generation, for example, an utterance transcription (which may be the same as or similar to a textual representation of the voice command as described herein) may be received at the embedding component 124. In other examples, a representation of non-audio input and/or non-speech audio input may be received. One or more RNNs may receive the utterance transcription and may map input information (e.g., the utterance transcription) from a high-dimensional space to a lower-dimensional space. This may allow the RNNs to determine relationships between the inputs it receives to process data more efficiently. By way of example in speech processing, instead of using high-dimensional vectors, the RNNs may map individual words from the utterance transcription to a low-dimensional vector, where each dimension may represent a particular feature of the word in question. From there, the RNNs may send the output from their processes to one or more feed forward layers. The feed forward layers may be configured to intake the output from the RNNs and to generate the embedding in question. The result of the embedding process may be a low-dimensional representation of the utterance transcription that has less storage needs and represents a vector value that may be associated with an embedding space. Generally, embeddings may have less storage requirements than unembedded versions of data utilized to generate the embeddings.

At block 412, the embedding component 124 may send the utterance embedding to the translation model 126. For example, as described in more detail above, the utterance embedding may differ materially from device embeddings given the differences in text and/or other information between utterances generally and device information generally. As, the translation model may be called to generate a translated embedding to more closely associate a given utterance with device embeddings. The translation model may be trained, such as by utilizing the processes described with respect to FIG. 3.

At block 414, the translation model 126 may generate a translated embedding utilizing the utterance embedding as input to the translation model 126. For example, a given utterance may be "please turn my bedroom light off." The utterance embedding generated from the utterance may be a low-dimensional representation of all of the words in the utterance, including information that is not specific to the device in question such as "please turn my" and "off." Another example may be an utterance of "it is dark in here, change that." In this example, none of the text data representing the utterance includes words that are explicitly associated with a device or otherwise device information, even though an action may have been performed by a device responsive to that utterance. To better associate utterances with devices, the translation model 126 may be trained and utilized.

At block 416, the translation model 126 may send the translated embedding to the shortlister 132. For example, the shortlister 132 may be called to perform a comparison or otherwise an analysis as between the translated embedding and device embeddings. The translated embedding may be sent to the shortlister 132 along with an identifier of the utterance such that the shortlister may refer to the identifier of the utterance may performing the comparison described below:

At block 418, returning to the embedding component 124, the embedding component 124 may query the user registry 130 for device information associated with the devices of the user account in question. For example, the device information may be the same or similar to the device information described with respect to block 404 as well as attributes of the devices including device names, device functionalities, device types, etc.

At block 420, the user registry 130 may return the device information to the embedding component 124. For example, the user registry 130 may be parsed for the specific device information called by the embedding component 124 such that the resulting information provided to the embedding component 124 may be utilized to generate embeddings as described herein.

At block 422, the embedding component 124 may generate device embeddings for individual ones of the devices associated with the user account in question. For example, the device embeddings may be generated in the same or a similar manner as generation of the utterance embeddings as described with respect to block 410, albeit utilizing the device information to generate the embedding instead of utilizing data representing the utterance. It should be understood that the processes described with respect to blocks 418, 420, and/or 422 may be performed at least partially in parallel with the operations described with respect to blocks 408, 410, and/or 412.

At block 424, the embedding component 124 may send the device embeddings to the translation model 126. The translation model 126 may receive the device embeddings and may, in examples, generate translated device embeddings that more closely correlate to the utterance embeddings described herein. In other examples, the translation model 126 may format or otherwise augment the device embeddings such that the shortlister 132 may compare the device embeddings with the translated utterance embedding.

At block 425, the translation model 126 may send the device embeddings to the shortlister 132. For example, the translation model 126 may send the device embeddings to the shortlister 132 along with the translated embedding of the utterance as described above. In this example, the embedding component 124 may provide the various embeddings to the shortlister 132 with a request to analyze the embeddings to determine similarities therebetween.

At block 426, the shortlister 132 may compare the translated embedding of the utterance with the device embeddings to determine a subset of the devices corresponding to device embeddings that are most similar to the translated embedding. For example, the shortlister may utilize cosine similarity processes to determine which of the device embeddings are most similar to the translated embedding. In the context of an embedding space, a threshold distance from the translated embedding may be established, and device embeddings with locations within the threshold distance may be selected for the subset of device embeddings. In other examples, similarity scoring may be utilized to determine which device embeddings are associated with similarity scores that satisfy a threshold score.

At block 428, the shortlister 132 may send information associated with the subset of the devices to the speech processing system 134. By way of nonlimiting example, utilizing the systems and methods described herein, the LLM may be fine-tuned such that when a given voice command is received, a subset of devices associated with the user account are determined as being most likely to be associated with the voice command, and information associated with that subset of devices may be provided as input to the LLM for determining what action to perform responsive to the voice command.

Figure 5:
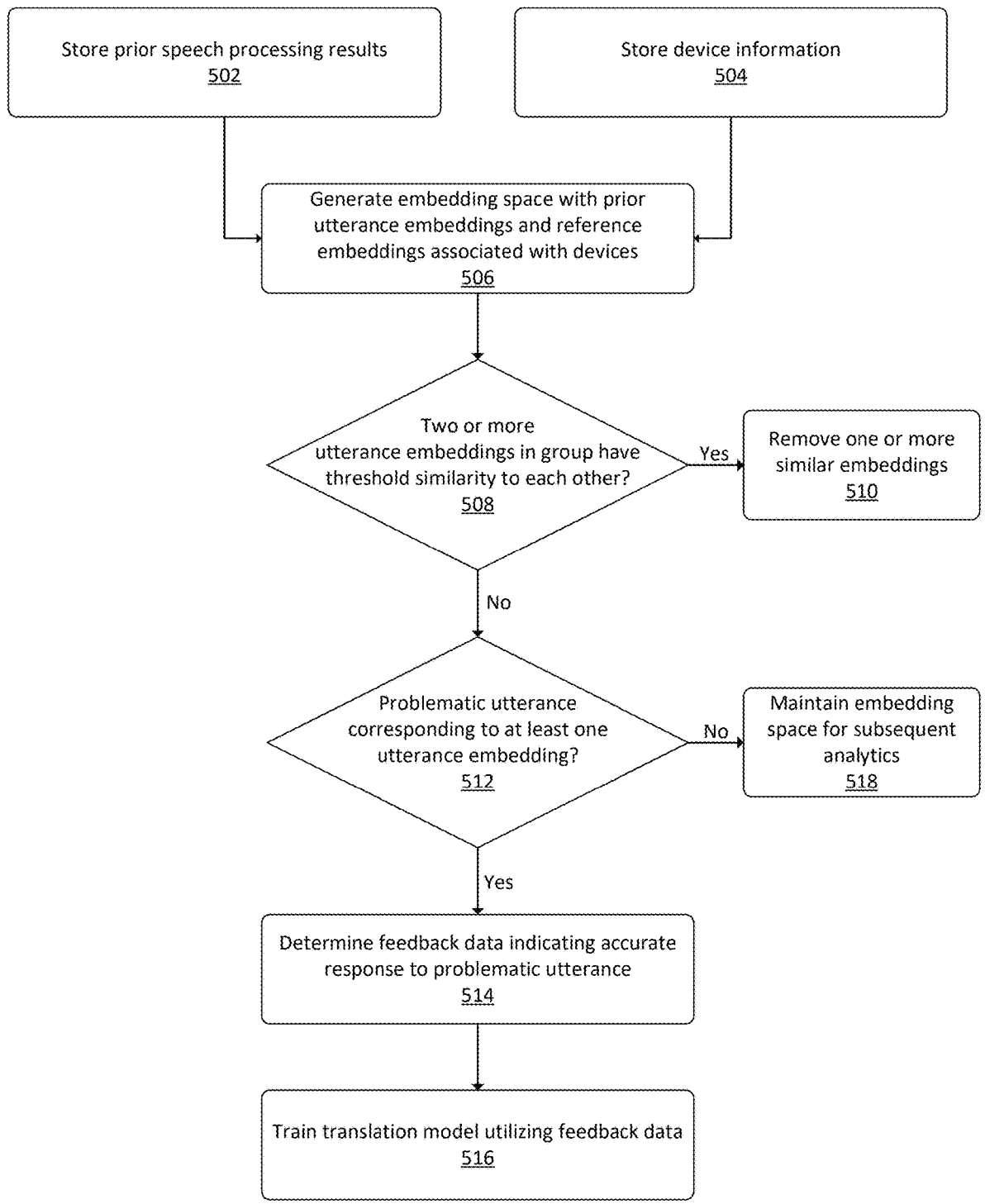
FIG. 5 illustrates a flow diagram of an example process for performing analytics utilizing an embedding space.

FIG. 5 illustrates a flow diagram of an example process 500 for performing analytics utilizing an embedding space. The order in which the operations or steps are described is not intended to be construed as a limitation, and any number of the described operations may be combined in any order and/or in parallel to implement process 500.

At block 502, the process 500 may include storing prior speech processing results. For example, as described in more detail above, a user registry may store information associated with a given user account. That information may include representations of prior utterances and the actions that were performed responsive to those prior utterances. These prior speech processing results may indicate the utterance itself, text data representing the utterance, directives associated with the utterance, identifiers of devices utilized to perform actions, responses output to the user, applications and/or speechlets utilized to produce the responses, etc.

At block 504, the process 500 may include storing device information. For example, again as described above in more detail, the user registry may store information about devices. The device information may include, for example, device identifiers, device names that have been associated with the devices via user input and/or via system-provided names, device functionalities, and/or device types. The device functionalities may include information such as what device states a given device is associated with, what actions the device can perform, etc.

At block 506, the process 500 may include generating an embedding space with prior utterance embeddings and reference embeddings associated with devices. For example, an analytics component may generate the embedding space that includes utterance embeddings (including translated utterance embeddings), device embeddings, and/or API embeddings. An embedding component as described in more detail above may be utilized to generate the utterance embeddings, which may be low-dimensional representations of text corresponding to the utterances. Some or all of the embeddings may be represented as vectors in the embedding space, with individual vectors being associated with a location in the embedding space. The embedding component may also generate device embeddings from the device information stored in the user registry, and in some examples the embedding component may generate the API embeddings from domain API information known by the system. By generating the embedding space as described herein, the information associated with user utterances and/or information associated with user accounts including device-related information, may be represented as embeddings. Doing so may result in the generation of a synthetic data set that does not itself include confidential and/or otherwise sensitive information that the user utterances themselves and/or the device information may include. This may allow for analytics to be performed on the confidential and/or otherwise sensitive information by analyzing the embeddings instead of reproducing, sending, or otherwise utilizing the confidential and/or other sensitive information itself.

At block 508, the process 500 may include determining whether two or more utterance embeddings in a group of embeddings have a threshold similarity to each other. For example, the embedding space may include a number of various utterance embeddings for utterances that were processed by the system. In some examples, given utterances may be very different from each other, such as a first utterance of "turn off the bedroom light" and a second utterance of "play Song A." Given the divergence between text in these two example utterances, their corresponding utterance embeddings and translated utterance embeddings may also be different and may be located as different areas of the embedding space. However, in a different example, a first utterance may be "turn off the bedroom light" and a second utterance may be "turn the bedroom light off." In this example, although the utterances differ in the arrangement of words, both utterances include the same information. Additionally, both of these utterances may be determined to be in the same group of utterances based at least in part on both utterances being associated with performing an action with respect to the "bedroom light."

In examples where at least two utterance embeddings in the group have the threshold similarity, the process 500 may include, at block 510, removing one or more of the embeddings from the embedding space. In this example, continuing to store data representing both utterance embeddings and/or both utterances may not be helpful because both utterance embeddings are associated with the same action being performed by the same device responsive to the underlying utterances. As such, the embedding space may be "cleaned up" by removing one of the utterance embeddings therefrom. Doing so may save on storage usage as well as processing power when analytics are performed on the utterance embeddings.

In examples where at least two of the utterance embeddings in the group do not satisfy the threshold similarity, the process 500 may include, at block 512, determining whether there is a problematic utterance corresponding to at least one utterance embedding. In examples, problematic utterances (or otherwise utterances where speech processing results were not favorable) may be determined and the translation model described herein may be trained to translate an utterance embedding for the problematic utterance into a translated embedding that more closely aligns with the appropriate device embedding. Examples of problematic utterances may be utterances where ASR and/or NLU results are associated with a low degree of confidence, and/or when a selected device to perform an action responsive to the utterance in question is selected with a low degree of confidence, and/or when the system does not respond to the utterance, etc.

In examples where there is a problematic utterance, the process 500 may include, at block 514, determining feedback data indicating an accurate response to the problematic utterance. In this example, the feedback data may be received from user input, from a third-party system associated with one or more devices, and/or from the system itself. The feedback data may indicate what the utterance should have been determined to be, what action should have been performed, and/or what device should have performed the action.

At block 516, the process 500 may include training a translation model utilizing the feedback data such that an utterance embedding of the problematic utterance is more closely mapped to a device embedding associated with a device to be utilized for performing an action responsive to the problematic utterance. For example, as outlined more completely above, a translation model may be utilized to intake utterance embeddings and output translated embeddings that more closely associate utterances with devices in an embedding space. In this example, the translation model may translate the problematic utterance embedding into what should be a vector that is associated with the device embedding of the correct device for responding to the utterance. Training of the translation model may involve changing parameters of the model, variables utilized by the model, parameter weighting, etc. such that the trained translation model outputs a translated utterance embedding for the problematic utterance that is more closely aligned with the device embedding than prior to the training.

Returning to block 512, in examples where there is not a problematic utterance, the process 500 may include, at block 518, maintaining the embedding space for subsequent analytics. In this example, analytics performed on the embedding space may indicate that changes to the embedding space, the translation model, and/or other aspects of the embedding-based LLM fine tuning should not be made given the data known to the system at a given time. As such, the embedding space may be maintained until additional data is collected and the analytics indicate that a change should be made.

Figure 6:
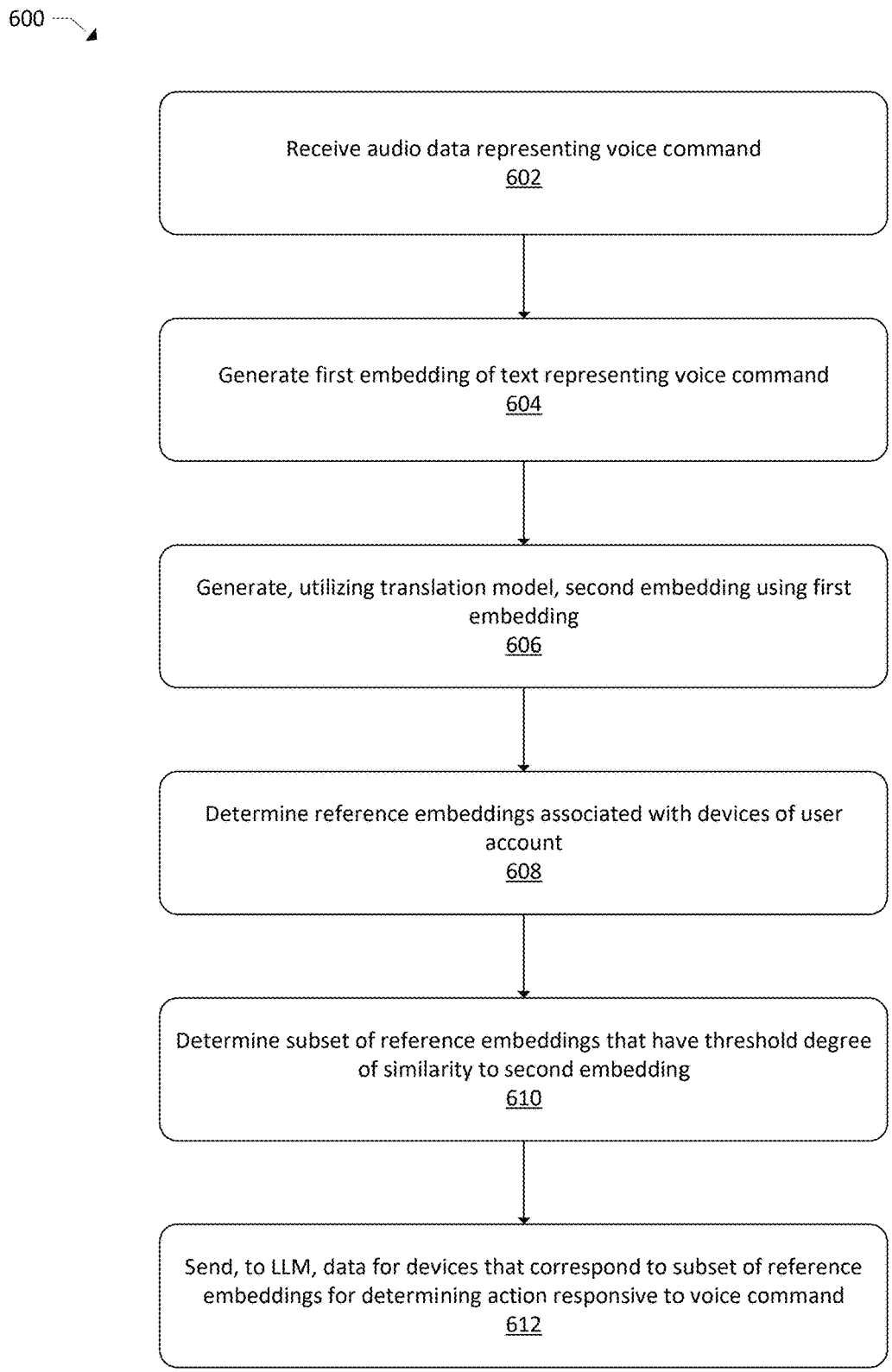
FIG. 6 illustrates a flow diagram of an example process for embedding-based LLM tuning.

FIG. 6 illustrates a flow diagram of an example process 600 for embedding-based LLM tuning. The order in which the operations or steps are described is not intended to be construed as a limitation, and any number of the described operations may be combined in any order and/or in parallel to implement process 600.

At block 602, the process 600 may include receiving audio data representing a voice command. For example, a speech processing system may be configured to receive audio data representing voice commands and to determine one or more actions to be performed and/or responses to be output that are responsive to the voice commands. To do so, in examples, the speech processing system may include a LLM that may receive, as input, audio data representing a given voice command (and/or text data representing the voice command) and may attempt to determine what action and/or response is intended from the voice command. By way of a nonlimiting example, a given voice command may be "turn the light green." In this example, the LLM may receive data representing the voice command and attempt to determine what action should be performed.

At block 604, the process 600 may include generating a first embedding of text representing the voice command. For example, embeddings may be low-dimensional representations of the data from which they were generated. For example, for an utterance embedding, the utterance may be associated with text data indicating a textual representation of a voice command provided to the system 104. When embedded, the utterance embedding may represent the text data as a string of numbers or otherwise values instead of the text data itself. These embeddings may be represented as vectors in a vector space, and the vectors may each be associated with a location in the vector space. Vectors that are nearer each other in the vector space may indicate similarities between the underlying data used to generate the vectors. while vectors that are farther apart may indicate divergent underlying data. With respect to embedding generation, for example, an utterance transcription (which may be the same as or similar to a textual representation of the voice command as described herein) may be received at the embedding component. In other examples, a representation of non-audio input and/or non-speech audio input may be received. One or more recurrent neural networks (RNNs) may receive the utterance transcription and may map input information (e.g., the utterance transcription) from a high-dimensional space to a lower-dimensional space. This may allow the RNNs to determine relationships between the inputs it receives to process data more efficiently. By way of example in speech processing, instead of using high-dimensional vectors, the RNNs may map individual words from the utterance transcription to a low-dimensional vector, where each dimension may represent a particular feature of the word in question. From there, the RNNs may send the output from their processes to one or more feed forward layers. The feed forward layers may be configured to intake the output from the RNNs and to generate the embedding in question. The result of the embedding process may be a low-dimensional representation of the utterance transcription that has less storage needs and represents a vector value that may be associated with an embedding space. Generally, embeddings may have less storage requirements than unembedded versions of data utilized to generate the embeddings.

At block 606, the process 600 may include generating, utilizing a translation model, a second embedding using the first embedding. For example, a translation model may be trained and utilized to translate the utterance embeddings into translated embeddings that are more closely related to the device embeddings. For example, a given utterance may be "please turn my bedroom light off." The utterance embedding generated from the utterance may be a low-dimensional representation of all of the words in the utterance, including information that is not specific to the device in question such as "please turn my" and "off." Another example may be an utterance of "it is dark in here, change that." In this example, none of the text data representing the utterance includes words that are explicitly associated with a device or otherwise device information, even though an action may have been performed by a device responsive to that utterance. To better associate utterances with devices, the translation model may be trained and utilized.

At block 608, the process 600 may include determining reference embeddings associated with devices of a user account. For example, the reference embeddings may correspond to device embeddings of devices associated with a given user account. These reference embeddings may be generated in the same or a similar manner as described above with respect to block 604, albeit with the reference embeddings being generated from device information instead of from user utterances.

At block 610, the process 600 may include determining a subset of the reference embeddings that have a threshold degree of similarity to the second embedding. In a given nonlimiting example, a shortlister may compare the translated embedding to the device embeddings to determine a subset of the device embeddings that are most similar to the translated embedding. The shortlister may utilize cosine similarity processes to determine which of the device embeddings are most similar to the translated embedding. In the context of an embedding space, a threshold distance from the translated embedding may be established, and device embeddings with locations within the threshold distance may be selected for the subset of device embeddings. In other examples, similarity scoring may be utilized to determine which device embeddings are associated with similarity scores that satisfy a threshold score. In should be understood that other comparison schemes may be utilized than those described by way of example herein, and generally this disclosure includes the comparison of the translated embedding to the reference embeddings to determine which reference embeddings are most similar to the translated embedding.

At block 612, the process 600 may include sending, to a LLM, data for devices that correspond to the subset of the reference embeddings for determining an action responsive to the voice command. By way of nonlimiting example, utilizing the systems and methods described herein, the LLM may be fine-tuned such that when a given voice command is received, a subset of devices associated with the user account are determined as being most likely to be associated with the voice command, and information associated with that subset of devices may be provided as input to the LLM for determining what action to perform responsive to the voice command.

Additionally, or alternatively, the process 600 may include generating a first dataset including utterance embeddings indicating prior voice commands. The process 600 may also include generating a second dataset including the reference embeddings. The process 600 may also include generating, utilizing contrastive learning processes, a training dataset that associates the utterance embeddings with the reference embeddings. The process 600 may also include training the translation model utilizing the training dataset.

Additionally, or alternatively, the process 600 may include determining, for a reference embedding of the reference embeddings and from the user account data, the device name. The process 600 may also include determining, from the user account data, one or more functions of a device associated with the device name, wherein the one or more functionalities indicate actions that the device is configured to perform. The process 600 may also include generating the reference embedding from the device name and the one or more functionalities.

Additionally, or alternatively, the process 600 may include determining API call embeddings associated with API calls configured to be made during speech processing of the voice command. The process 600 may also include determining an API call embedding of the API call embeddings that is most similar to the second embedding. The process 600 may also include selecting, from the API call embedding being most similar to the second embedding, an API call associated with the API call embedding. The process 600 may also include sending, to the LLM and in addition to the first data, second data identifying the API call that the LLM may utilize for accessing information for determining the response to the voice command.

Additionally, or alternatively, the process 600 may include storing prior user input embeddings in an embedding space, wherein individual ones of the prior user input embeddings are associated with a prior user input. The process 600 may also include determining a prior user input embedding that is nearest the second embedding in the embedding space. In these examples, determining the subset of the reference embeddings may be based at least in part on satisfying the threshold similarity to the prior user input embedding.

Additionally, or alternatively, the process 600 may include storing second data representing an embedding space with prior user input embeddings. The process 600 may also include determining a group of the prior user input embeddings that are associated with a device name embedding in the embedding space. The process 600 may also include determining that a first prior user input embedding in the group of the prior user input embeddings has at least a threshold degree of similarity to a second prior user input embedding in the group of the prior user input embeddings.

The process 600 may also include causing at least one of the first prior user input embedding or the second prior user input embedding to be removed from the embedding space.

Additionally, or alternatively, the process 600 may include storing second data representing an embedding space with prior user input embeddings and the reference embeddings. The process 600 may also include determining that the LLM inaccurately responded to sample user input and receiving feedback data indicating an accurate response to the sample user input. The process 600 may also include training the translation model such that a location in the embedding space of a sample user input embedding corresponding to the sample user input is modified to be nearer a reference embedding associated with the accurate response.

Additionally, or alternatively, the process 600 may include determining, based at least in part on the user input data being associated with the user account data, a number of devices associated with the user account data. The process 600 may also include determining that the number of devices satisfies a threshold number of devices predetermined to be more than the LLM can utilize as input. In these examples, generating the first embedding may be based at least in part on the number of devices satisfying the threshold number of devices.

Figure 7:
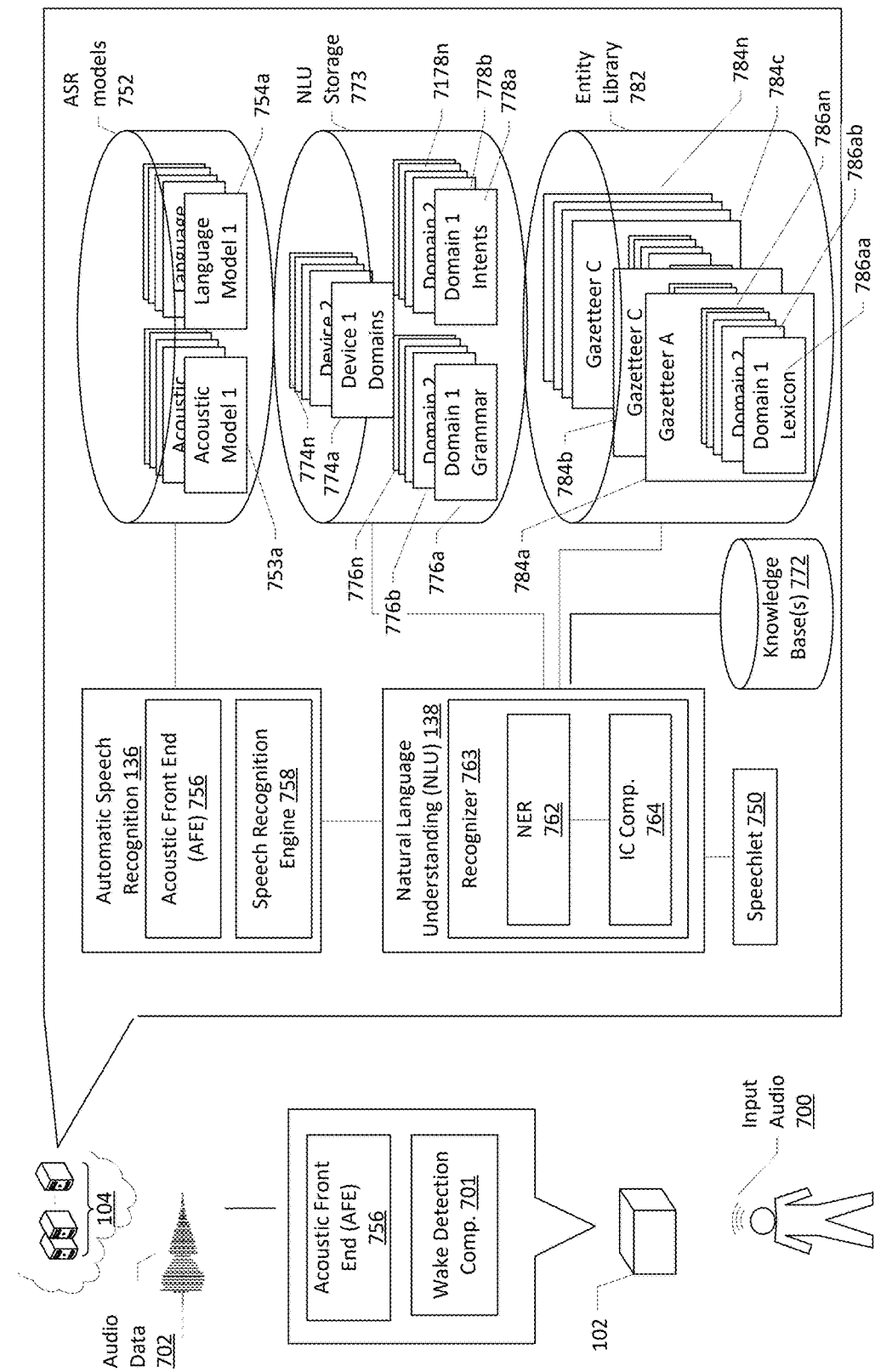
FIG. 7 illustrates a conceptual diagram of components of a speech-processing system for processing audio data provided by one or more devices.

FIG. 7 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 7 may occur directly or across a network 106. An audio capture component, such as a microphone 114 of the device 102, or another device, captures audio 700 corresponding to a spoken utterance. The device 102, using a wake word engine 701, then processes audio data corresponding to the audio 700 to determine if a keyword (such as a wakeword) is detected in the audio data. Following detection of a wakeword, the device 102 processes audio data 702 corresponding to the utterance utilizing an ASR component 136. The audio data 702 may be output from an optional acoustic front end (AFE) 756 located on the device prior to transmission. In other instances, the audio data 702 may be in a different form for processing by a remote AFE 756, such as the AFE 756 located with the ASR component 136.

The wake word engine 701 works in conjunction with other components of the user device, for example a microphone to detect keywords in audio 700. For example, the device may convert audio 700 into audio data, and process the audio data with the wake word engine 701 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input: the energy levels of the audio input in one or more spectral bands: the signal-to-noise ratios of the audio input in one or more spectral bands: or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word engine 701 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match pre-configured acoustic waveforms, audio fingerprints, or other data to determine if the incoming audio "matches" stored audio data corresponding to a keyword.

Thus, the wake word engine 701 may compare audio data to stored models or data to detect a wakeword. One approach for wakeword detection applies general large vocabulary continuous speech recognition (LVCSR) systems to decode the audio signals, with wake-word searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/RNN structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake." The audio data 702 may include data corresponding to the wakeword. Further, a local device may "wake" upon detection of speech/spoken audio above a threshold, as described herein. An ASR component 136 may convert the audio data 702 into text. The ASR transcribes audio data into text data or other ASR output data representing the words of the speech contained in the audio data 702. The text data or other ASR output data may then be used by other components for various purposes, such as executing system commands, inputting data, etc. A spoken utterance in the audio data is input to a processor configured to perform ASR which then interprets the utterance based on the similarity between the utterance and pre-established language models 754 stored in an ASR model knowledge base (ASR Models Storage 752). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 753 stored in an ASR Models Storage 752), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 136 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 756 and a speech recognition engine 758. The acoustic front end (AFE) 756 transforms the audio data from the microphone into data for processing by the speech recognition engine 758. The speech recognition engine 758 compares the speech recognition data with acoustic models 753, language models 754, and other data models and information for recognizing the speech conveyed in the audio data. The AFE 756 may reduce noise in the audio data and divide the digitized audio data into frames representing time intervals for which the AFE 756 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 758 may process the output from the AFE 756 with reference to information stored in speech/model storage (752). Alternatively, post front-end processed data (such as feature vectors) may be received by the device executing ASR processing from another source besides the internal AFE. For example, the user device may process audio data into feature vectors (for example using an on-device AFE 756).

The speech recognition engine 758 attempts to match received feature vectors to language phonemes and words as known in the stored acoustic models 753 and language models 754. The speech recognition engine 758 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, what time is the pool open until" The wake detection component may identify the wake word, otherwise described as a trigger expression, "Alexa," in the user utterance and may "wake" based on identifying the wake word. The speech recognition engine 758 may identify, determine, and/or generate text data or other ASR output data corresponding to the user utterance, here "what time is the pool open until."

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 758 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 138 may include various components, including potentially dedicated processor(s), memory, storage, etc. As shown in FIG. 7, an NLU component 138 may include a recognizer 763 that includes a named entity recognition (NER) component 762 which is used to identify portions of query text that correspond to a named entity that may be recognizable by the system. A downstream process called named entity resolution links a text portion to a specific entity known to the system. To perform named entity resolution, the system may utilize gazetteer information (784a-784n) stored in entity library storage 782. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 136 based on the utterance input audio 700) and attempts to make a semantic interpretation of the text. That is, the NLU process determines the meaning behind the text based on the individual words and then implements that meaning. NLU processing 138 interprets a text string to derive an intent or a desired action from the user as well as the pertinent pieces of information in the text that allow a device (e.g., device 102) to complete that action. For example, if a spoken utterance is processed using ASR 136 and outputs the text "what time is the pool open until" the NLU process may determine that the user intended to receive a response to the voice command indicating a time when the pool of the enterprise entity closes.

The NLU 138 may process several textual inputs related to the same utterance. For example, if the ASR 136 outputs N text segments (as part of an N-best list), the NLU may process all N outputs to obtain NLU results.

As will be discussed further below, the NLU process may be configured to parse and tag to annotate text as part of NLU processing. For example, for the text "what time is the pool open until," "what time" may be tagged as a command (to determine a time to respond to the user with).

To correctly perform NLU processing of speech input, an NLU process 138 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 762 receives a query in the form of ASR results and attempts to identify relevant grammars and lexical information that may be used to construe meaning. To do so, the NLU component 138 may begin by identifying potential domains that may relate to the received query. The NLU storage 773 includes a database of devices (774a-774n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 763, language model and/or grammar database (776a-776n), a particular set of intents/actions (778a-778n), and a particular personalized lexicon (786). Each gazetteer (784a-784n) may include domain-indexed lexical information associated with a particular user and/or device. For example, the Gazetteer A (784a) includes domain-index lexical information 786aa to 786an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 764 parses the query to determine an intent or intents for each identified domain, where the intent corresponds to the action to be performed that is responsive to the query. Each domain is associated with a database (778a-778n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 764 identifies potential intents for each identified domain by comparing words in the query to the words and phrases in the intents database 778. In some instances, the determination of an intent by the IC component 764 is performed using a set of rules or templates that are processed against the incoming text to identify a matching intent.

In order to generate a particular interpreted response, the NER 762 applies the grammar models and lexical information associated with the respective domain to actually recognize a mention of one or more entities in the text of the query. In this manner, the NER 762 identifies "slots" or values (i.e., particular words in query text) that may be needed for later command processing. Depending on the complexity of the NER 762, it may also label each slot with a type of varying levels of specificity (such as noun, place, device name, device location, city, artist name, song name, amount of time, timer number, or the like). Each grammar model 776 includes the names of entities (i.e., nouns) commonly found in speech about the particular domain (i.e., generic terms), whereas the lexical information 786 from the gazetteer 784 is personalized to the user(s) and/or the device. For instance, a grammar model associated with the shopping domain may include a database of words commonly used when people discuss shopping.

The intents identified by the IC component 764 are linked to domain-specific grammar frameworks (included in 776) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (776) framework or frameworks may correspond to sentence structures such as "purchase item called 'Item A' from Marketplace A."

For example, the NER component 762 may parse the query to identify words as subject, object, verb, preposition, etc., based on grammar rules and/or models, prior to recognizing named entities. The identified verb may be used by the IC component 764 to identify intent, which is then used by the NER component 762 to identify frameworks. A framework for the intent of "play a song." meanwhile, may specify a list of slots/fields applicable to play the identified "song" and any object modifier (e.g., specifying a music collection from which the song should be accessed) or the like. The NER component 762 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 762 may search the database of generic words associated with the domain (in the knowledge base 772). So, for instance, if the query was "identify this song," after failing to determine which song is currently being output, the NER component 762 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 750. The speechlet 750 may be determined based on the NLU output. For example, if the NLU output includes a command to send a message, the destination speechlet 750 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the destination speechlet 750 may provide some or all of this information to a text-to-speech (TTS) engine. The TTS engine may then generate an actual audio file for outputting the audio data determined by the application (e.g., "okay," or "the pool closes at 10:00 pm").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 138 during runtime operations where NLU operations are performed on text (such as text output from an ASR component 136). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 763. Each recognizer may include various NLU components such as an NER component 762, IC component 764 and other components such as an entity resolver, or other components.

For example, a messaging domain recognizer 763-A (Domain A) may have an NER component 762-A that identifies what slots (i.e., portions of input text) may correspond to particular words relevant to that domain. The words may correspond to entities such as (for the messaging domain) a recipient. An NER component 762 may use a machine learning model, such as a domain specific conditional random field (CRF) to both identify the portions corresponding to an entity as well as identify what type of entity corresponds to the text portion. The messaging domain recognizer 763-A may also have its own intent classification (IC) component 764-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 104, as illustrated herein are exemplary, and may be located in a stand-alone device or may be included, in whole or in part, as a component of a larger device or system, may be distributed across a network or multiple devices connected by a network, etc.

Figure 8:
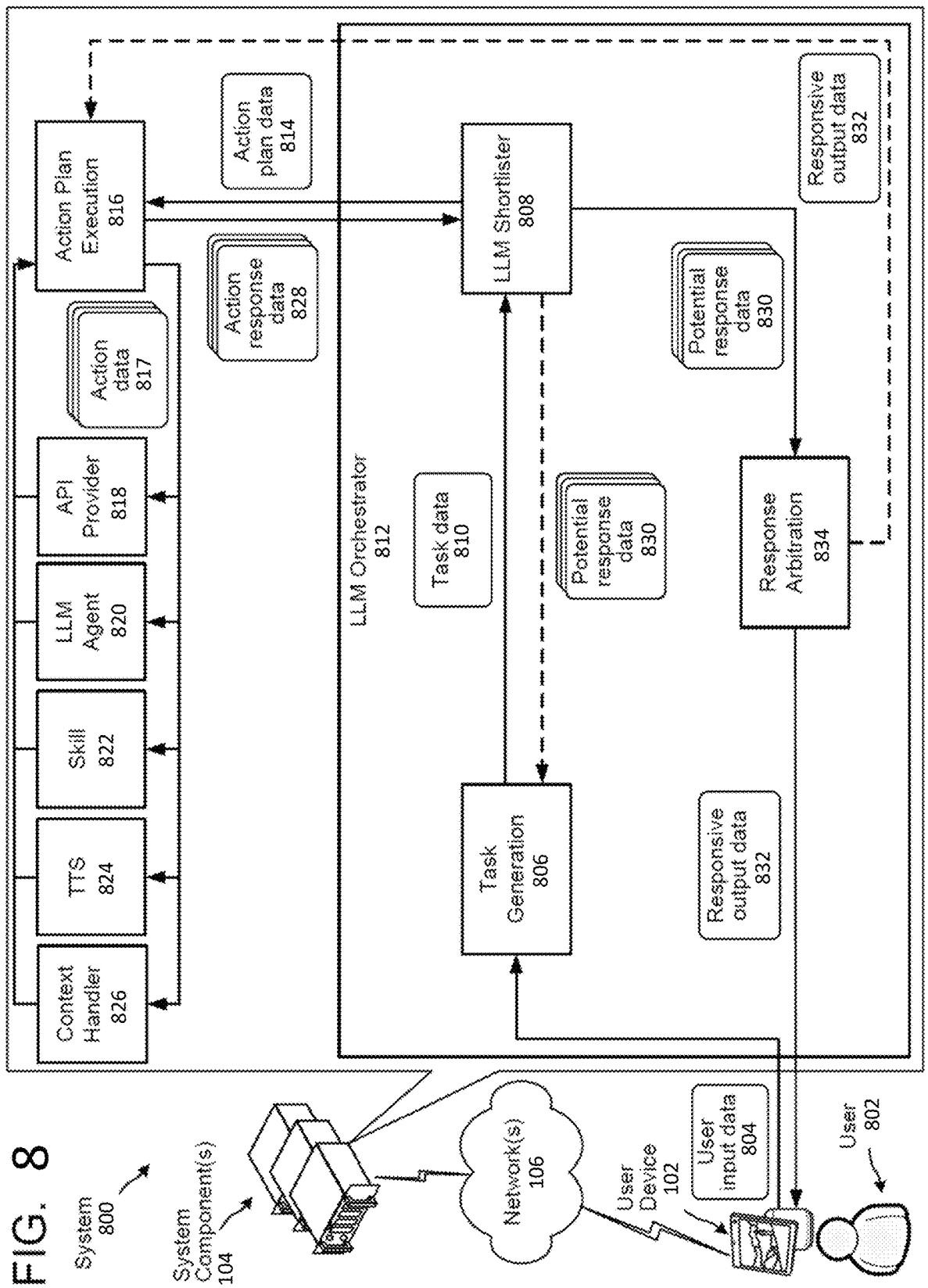
FIG. 8 is a conceptual diagram illustrating example components and processing of a system configured to determine a response to a user input, according to embodiments of the present disclosure.

FIG. 8 illustrates further example components included in the system 800 configured to determine an action responsive to a user input and in which the context handler component 826 may be implemented. As shown in FIG. 8, the system may include a user device 102, local to a user 802, in communication with a system component(s) 104 via a networks(s) 106. The networks(s) 106 may include the Internet and/or any other wide- or local-area network, and may include wired, wireless, and/or cellular network hardware.

The system component(s) 104 may include various components, such as a large language model (LLM) orchestrator component 812, and an action plan execution component 816. The LLM orchestrator component 812 may include a task generation component 806, an LLM shortlister component 808, and a response arbitration component 834.

In some embodiments, the LLM orchestrator component 812 may generate prompt data representing a prompt for input to one or more language models. As shown in FIG. 8, the system component(s) 104 receive the user input data 804, which may be provided to the LLM orchestrator component 812. In some instances, the user input data 804 may correspond to various data types, such as text (e.g., a text or tokenized representation of a user input), audio, image, video, etc. For example, the user input data may include input text (or tokenized) data when the user input is a typed natural language user input. For further example, prior to the LLM orchestrator component 812 receiving the user input data 804, another component (e.g., an automatic speech recognition (ASR) component 136) of the system 800 may receive audio data representing the user input. The ASR component 136 may perform ASR processing on the audio data to determine ASR data corresponding to the user input, which may correspond to a transcript of the user input. As described below, with respect to FIG. 12, the ASR component 136 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 136 level of confidence that the corresponding hypothesis represents what the user said. The ASR component 136 may also determine token scores corresponding to each token/word of the ASR hypothesis, where the token score indicates the ASR component's 136 level of confidence that the respective token/word was spoken by the user. The token scores may be identified as an entity score when the corresponding token relates to an entity. In some instances, the user input data 804 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 800 may include one or more components configured to process such user inputs to generate the text or tokenized representation of the user input (e.g., the user input data 804).

In some embodiments, the LLM orchestrator component 812 may receive input data, which may be processed in a similar manner as the user input data 804 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the device 102, a user entering the home, etc.). In some embodiments, the system 800 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 800 may include one or more components configured to process the input data to generate a natural language representation of the input data. The system 800 may process the input data and may perform an action. For example, in response to detecting a garage door opening, the system 800 may cause garage lights to turn on, living room lights to turn on, etc. As another example, in response to detecting an oven beeping, the system 800 may cause a device 102 (e.g., a smartphone, a smart speaker, etc.) to present an alert to the user. The LLM orchestrator component 812 may process the input data to generate tasks that may cause the foregoing example actions to be performed.

In some embodiments, the LLM orchestrator component 812 may generate prompt data representing a prompt for input to the language models. As shown in FIG. 8, the user input data 804 may be received at the task generation component 806 of the LLM orchestrator component 812, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 800), as described in detail herein below with respect to FIG. 9. For example, for a user input of "What is the weather for today," the task generation component 806 may generate a list of tasks of "(1) determine current outside temperature from thermostat; and (2) determine weather forecast for today" and select the task of "determine weather forecast for today" to be completed first. For further example, for a user input of "I am back, please continue outputting the recipe instructions," the task generation component 806 may generate a list of tasks of "(1) determine context for outputting the recipe instructions; and (2) resume output of the recipe instructions" and select the task of "determine context for outputting the recipe instructions" to be completed first.

In instances where the task generation component 806 generates more than one task to be completed in order to perform the action responsive to the user input, the task generation component 806 may further maintain and prioritize the list of tasks as the processing of the system 800 with respect to the user input is performed. In other words, as the system 800 processes to complete the list of tasks, the task generation component 806 may (1) incorporate the potential responses associated with completed tasks into data provided to other components of the system 800: (2) update the list of tasks to indicate completed (or attempted, in-progress, etc.) tasks: (3) generate an updated prioritization of the tasks remaining to be completed (or tasks to be attempted again); and/or (4) determine an updated current task to be completed. The task generation component 806 may generate and send task data 810 representing the selected task to be completed and various other information needed to perform further processing with respect to the task (e.g., the user input data 804, an indication of the selected task, potential responses associated with previous tasks, the remaining task(s), and context data associated with the user input data 804, as described in detail herein below with respect to FIG. 9) to the LLM shortlister component 808.

The LLM shortlister component 808 may be configured to determine one or more components (e.g., an API provider component 818, skill component(s) 822, LLM agent component(s) 820, a TTS component 824, the context handler component 826, etc.) configured to perform an action related to the user input or the current task. The LLM shortlister component 808 may further be configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). For example, for a current task of "determine weather forecast for today," the LLM shortlister component 808 may generate requests of "determine user's preferred weather application," "use Weather Application A to determine weather forecast for today," "use Weather Application B to determine weather forecast for today," or the like. Such requests may be represented in the action plan data 814 sent to the action plan execution component 816. The action plan execution component 816 may identify the request(s) in the action plan data 814, generate executable API calls corresponding to the request(s), and cause the corresponding components (e.g., the API provider component 818, the LLM agent component 820, the skill component 822, the TTS component 824, and/or the context handler component 826) to generate action response data 828 representing the requested potential response(s), where individual action response data 828 may be provided by/correspond to a particular component-one of the API provider component 818, the LLM agent component 820, the skill component 822, the TTS component 824, and/or the context handler component 826. In some embodiments, the action response data 828 may include an identifier (e.g., a component name, an alphanumerical value associated with the component, etc.) for the component providing the data. The LLM shortlister component 808 receives and processes the action response data 828 and generates potential response data 830 representing the potential response(s) (e.g., relevant potential responses, selected potential responses, ranked potential responses, etc.) for further processing (e.g., as described in detail herein below with respect to FIG. 9). If the LLM shortlister component 808 determines that there are no remaining tasks to generate potential responses for, the LLM shortlister component 808 may send the potential response data 830 to the response arbitration component 834.

The potential response data 830, in some embodiments, may be determined based on receiving potential responses from various different components that may be relevant in responding to the user input data 804. For example, the potential response data 830 may include a first potential response from a first component configured to perform a first task determined by the task generation component 806, a second potential response from a second component configured to perform a second task determined by the task generation component 806, etc. The potential response data 830 can include more than one potential response relating to an individual task. In some embodiments, the potential response data 830 may be natural language data.

The response arbitration component 834 processes the potential response data 830 to determine whether the potential responses generated for the one or more tasks are responsive to the user input. The response arbitration component 834 processes the potential response data 830 (representing at least the generated potential responses) and selects one or more of the potential responses that are determined to be responsive to the user input and/or determines that none of the actions are responsive to the user input. For example, the response arbitration component 834 may process the potential response data 830 to determine if one or more of the potential responses performable by the API(s) (e.g., the potential responses and/or potential actions) are responsive to the current task. In some embodiments, the response arbitration component 834 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening." the response arbitration component 834 may generate a natural language summary of "The weather for today is expected to be mostly sunny with a high of 75 and a low of 68 and a slight chance of rain in the evening," or the like.

Figure 9:
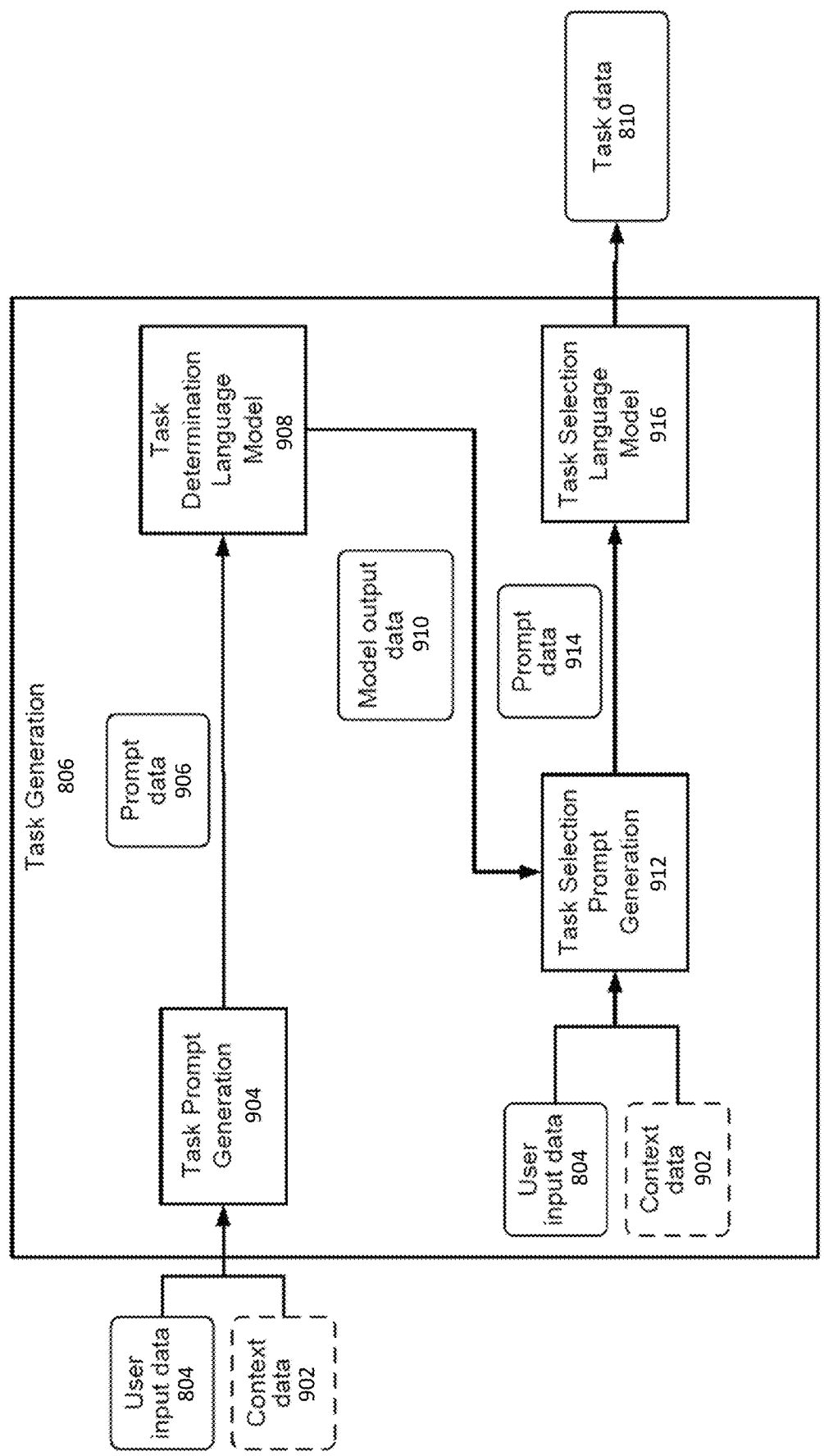
FIG. 9 is a conceptual diagram illustrating example components and processing of a plan generation component, according to embodiments of the present disclosure.

FIG. 9 illustrates example processing of the task generation component 806. As shown in FIG. 9, the task generation component 806 may include a task prompt generation component 904, a task determination language model 908, a task selection prompt generation component 912, and a task selection language model 916.

As further shown in FIG. 9, the user input data 804 is received at the task prompt generation component 904, which is configured to generate a list (e.g., one or more) of tasks (e.g., steps/actions) that are to be completed in order to perform an action responsive to the user input and select a task of the list of the tasks that is to be completed first (e.g., in a current iteration of processing by the system 800). As discussed herein above, in some embodiments, the prompt generation component 904 may correspond to the task prompt generation component 904, and vice versa.

The task prompt generation component 904 processes the user input data 804 to generate prompt data 906 representing a prompt for input to the task determination language model 908. In some embodiments, the task prompt generation component 904 may further receive an indication of one or more remaining tasks to be completed with respect to the user input data 804. A task to be completed may correspond to a task for which the system 800 has yet to generate potential responses for (e.g., for which a responding component, such as the API provider component 818, the LLM agent component 820, the skill component 822, the TTS component 824, and/or the context handler component 826 have yet to generate action response data for). Similarly, a completed task may correspond to a task for which the system 800 has generated potential responses for (e.g., for which a responding component, such as the API provider component 818, the LLM agent component 820, the skill component 822, the TTS component 824, and/or the context handler component 826 have generated action response data). For example, if the current iteration of processing with respect to the user input data 804 is a subsequent iteration of processing (e.g., the system previously determined that more than one task is to be completed in order to perform an action responsive to the user input data 804 and has previously generated potential responses for at least a first task of the more than one tasks), then the task prompt generation component 904 may further receive an indication of the remaining tasks to be completed. In such embodiments, the task prompt generation component 904 may further receive an indication of the task(s) to complete processing for and/or the potential response(s) of the processing. The task prompt generation component 904 may further receive the context data 902 representing various contextual signals associated with/relevant to the user input data 804, such as user profile information (e.g., user ID, user behavioral information, user preferences, age, gender, devices associated with the user profile, etc.), weather information, time of day, device information associated with the device that sent the user input data 804 (e.g., device ID, device states, historical device interaction data, etc.). In some embodiments, the context data 902 may correspond to the context data retrieved by the context handler component 826. For example, the context data 902 may be retrieved during a previous iteration of processing by the LLM orchestrator component 812, where the context data 902 was caused to be retrieved by the LLM shortlister component 808 (e.g., in response to the task generation component 806 determining that the context data is to be retrieved) and sent to the task generation component 806 thereafter (e.g., as potential response data). In other embodiments, the context data 902 may correspond to the context data stored in the memory storage, as discussed herein. Such prompt data 906 may be generated based on combining the user input data 804 and the context data 902 (and, in some embodiments, the indication of the remaining task(s), completed task(s), and/or the potential responses).

In some embodiments, the prompt data 906 may be an instruction for the task determination language model 908 to determine one or more tasks (e.g., steps/actions) that are to be completed in order to perform an action responsive to the user input given the other information (e.g., the context data 902, the indication of the remaining task(s), the indication of the completed task(s), and/or the corresponding potential responses) included in the prompt data 906.

For example for a user input of "turn on all of the lights except the garage," the task prompt generation component 904 may generate example prompt data 906:

{
Create a new task if necessary to help complete a request to turn on all of the lights except the garage.
Here are the completed tasks, their potential responses, user inputs, and context so far:
[ ]
These are the remaining tasks to be completed:
[ ]
Based on the result, create new tasks to be completed, if necessary.
}

In some embodiments, the task prompt generation component 904 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 906 may include "Please generate a polite, respectful, and safe response and one that does not violate protected class policy."

The task determination language model 908 processes the prompt data 906 to generate model output data 910 representing one or more predicted tasks to be completed in order to perform the action responsive to the user input. For example, based on processing the first example prompt data provided above, the task determination language model 908 may output model output data 910: {"turn on all of the lights except the garage light,"} or the like. In some embodiments, the threshold for determining the one or more tasks may be such that the task determination language model 908 is encouraged to generate multiple predicted tasks for a given user input, where the system 800 may parse and filter the list of tasks during downstream processing (e.g., during the processing of the task selection language model 916). For example, based on processing the first example prompt data provided above, the task determination language model 908 may output model output data 910: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor,"} or the like. As discussed herein above, in some embodiments the LLM may correspond to the task determination language model 908. As such, in such embodiments, the task determination language model 908 may process, in addition to the processing described herein below, similarly to LLM discussed herein above (e.g., the task determination language model 908 may determine that context data is needed to generate a response to a user input, such as by generating a context-retrieval task).

As an example of a user input that is associated with more than one task, the LLM orchestrator component 812 may receive a user input of "please order some pizza for dinner" and the task prompt generation component 904 may generate example prompt data 906:

{
Create a new task if necessary to help complete a request to order some pizza for dinner.
Here are the completed tasks, their potential responses, user inputs, and context so far:
[ ]
These are the remaining tasks to be completed:
[ ]
Based on the result, create new tasks to be completed, if necessary.
}

The task determination language model 908 processes the prompt data 906 to generate model output data 910 representing one or more predicted tasks to be completed in order to perform the action responsive to the user input. For example, based on processing the example prompt data provided above, the task determination language model 908 may output model output data 910: {"identify user pizza preference:" (or some other request for context, such as "determine context to order pizza for dinner") "find application that enables ordering of pizza,"} or the like.

As an example of a subsequent round of processing with respect to a user input (e.g., processing performed with respect to a user input that is associated with more than one task), and for the abovementioned user input of "please order some pizza for dinner", the system 800 may process as described herein below to select and complete the task of "identify user pizza preference" (or some other request for context). The task prompt generation component 904 may process the user input, corresponding context data, the remaining task list, and the potential responses (e.g., the users pizza preference, determined, for example, using the context data 902 retrieved using the context handler component 826) to generate example prompt data 906:

{
Create a new task if necessary to help complete a request to order some pizza for dinner.
Here are the completed tasks, their potential responses, user inputs, and context so far:
Completed tasks:
Identify user pizza preference: user ordered Brooklyn style pizza from [Pizza Company Name 1]
These are the remaining tasks to be completed:
Find application to order pizza
Based on the result, create new tasks to be completed, if necessary.
}

The task determination language model 908 processes the prompt data 906 to generate model output data 910 representing one or more predicted tasks to be completed in order to perform the action responsive to the user input. For example, based on processing the example prompt data provided above, including the context data retrieved using the context handler component 826 during the previous round of processing, the task determination language model 908 may further output model output data 910: {"find an application to order pizza" "find API to order [Pizza Company Name 1] pizza,"} or the like.

In some embodiments, the one or more predicted tasks may include a task of storing context data. For example, the model output data 910 may include a task of storing relevant context data used during the processing performed with respect to the user input data 804. For further example, the model output data 910 may include a task of storing context data that was used during the processing performed with respect to previous user input data.

The model output data 910 is sent to the task selection prompt generation component 912, which processes the model output data 910 to generate prompt data 914 representing a prompt for input to the task selection language model 916. In some embodiments, such prompt data 914 may be generated based on combining the user input data 804, the context data 902, the prompt data 906, and/or the model output data 910. In some embodiments, the task generation component 806 may include another component that parses the model output data 910 to determine the one or more tasks and may send a representation of the one or more tasks to the task selection prompt generation component 912.

In some embodiments, the prompt data 914 may be an instruction for the task selection language model 916 to select a task of the one or more tasks that is to be completed first (e.g., completed during the current iteration of processing) given the information (e.g., user input data 804, the context data 902, and the one or more tasks) included in the prompt data 914. In some embodiments, the prompt data 914 may further include an instruction for the task selection language model 916 to determine a priority of the one or more tasks (e.g., an ordered list representing the order in which the one or more tasks are to be completed).

For example, for the example user input provided above of "please order some pizza for dinner," the task selection prompt generation component 912 may generate example prompt data 914:
{
Select the top prioritized task given the ultimate goal of order some pizza for dinner
Here are the completed tasks, their potential responses, user inputs, and context so far:
[ ]
Here are the task candidates:
Identify user pizza preference (or some other context retrieval task)
Find an application that sells pizza
Return your selected task, return None if the goal is achieved or indicate existing ambiguities.
}
For further example, for the second round of processing performed with respect to the example user input of "please order some pizza for dinner," the task selection prompt generation component 912 may generate example prompt data 914:
{
Select the top prioritized task given the ultimate goal of please order some pizza for dinner
Here are the completed tasks, their potential responses, user inputs and context so far:
Completed tasks:
  Identify user pizza preference: user ordered Brooklyn style pizza from [Pizza Company 1 Name]
Here are the task candidates:
find an application that sells pizza
find API that sells [Pizza Company 1 Name] pizza
Return your selected task, return None if the goal is achieved or indicate existing ambiguities.
}
In some embodiments, the task selection prompt generation component 912 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The task selection language model 916 processes the prompt data 914 to generate model output data representing the task to be completed first and/or a prioritization of the one or more tasks. For example, based on processing the first example prompt data 914 provided above, the task selection language model 916 may output model output data: {"1. Identify user pizza preference,"} or the like. For further example, based on processing the second example prompt data 914 provided above, the task selection language model 916 may output model output data: {"1. Find an API that sells [Pizza Company Name 1] pizza, "} or the like. In some embodiments, during processing of the task selection language model 916 to select and/or prioritize the one or more tasks, the task selection language model 916 may update the task list to remove any redundant and/or conflicting tasks. For example, for the example prompt data 914, the task selection language model 916 may determine that the remaining tasks of "find an application that sells pizza" and "find an API that sells [Pizza Company Name 1] pizza" are redundant, and that "find an API that sells [Pizza Company Name 1] pizza has a higher priority. Therefore, the task selection language model 916 may remove the task of "find an application that sells pizza" from the remaining task list. Thereafter, the task generation component 806 (or another component of the task generation component 806) may process the model output data of the task selection language model 916 to determine task data 810 representing the user input data 804 and/or the task selected by the task selection language model 916 to be completed first. In some embodiments, the task data 810 may include the remaining one or more tasks and/or may indicate the prioritization of the one or more tasks, as determined by the task selection language model 916. The task data 810 may be sent to the LLM shortlister component 808, which is described in detail herein below with respect to FIG. 10.

Figure 10:
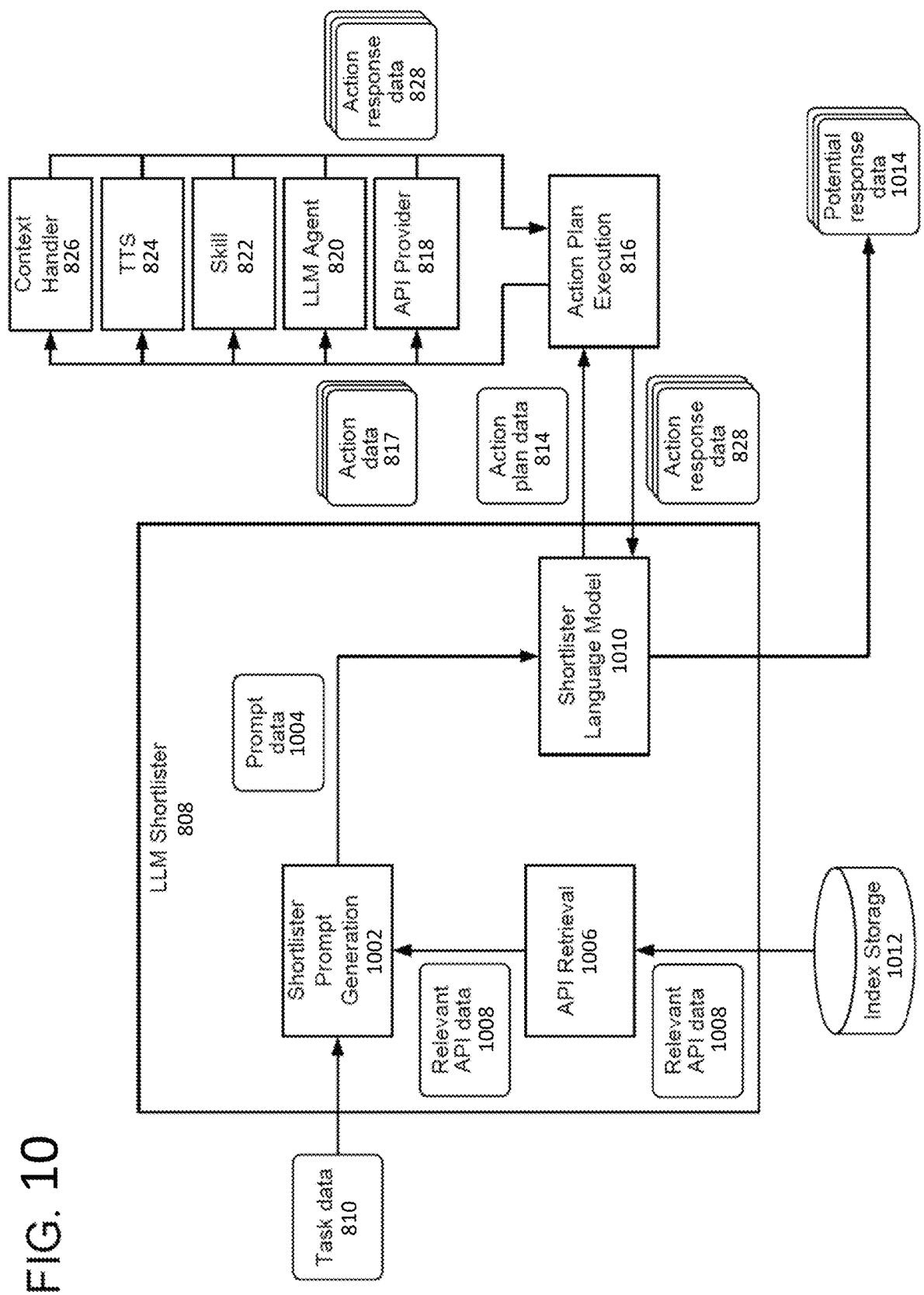
FIG. 10 is a conceptual diagram illustrating example components and processing of a LLM shortlister component, according to embodiments of the present disclosure.

FIG. 10 illustrates example processing of the LLM shortlister component 808. As shown in FIG. 10, the LLM shortlister component 808 may include an index storage 1012, an API retrieval component 1006, a shortlister prompt generation component 1002, and a shortlister language model 1010.

The LLM shortlister component 808 is configured to determine one or more components (e.g., APIs (via the API provider component 818, skill component(s) 822, LLM agent component(s) 820, TTS component 824, context handler component 826, etc.) configured to perform an action related to the user input or the current task. The LLM shortlister component 808 is further configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task).

As further shown in FIG. 10, the task data 810 is received at the shortlister prompt generation component 1002. The shortlister prompt generation component 1002 processes the task data 810 to generate prompt data 1004 representing a prompt for input to the shortlister language model 1010. In some embodiments, such prompt data 1004 may be generated based on combining the task data 810 (e.g., the user input data 804, the context data 902, the selected task, remaining tasks, potential responses associated with one or more previous tasks, etc.) and relevant API data 1008 representing one or more APIs associated with the user input data 804 and/or the current task.

The relevant API data 1008 may be generated by the API retrieval component 1006, which may be configured to retrieve one or more (e.g., top-k) relevant APIs associated with the user input data 804 or the current task. In some embodiments, the APIs may correspond to various components. For example, the components may correspond to rule-based components, ML-based components, LLM-based components, or the like, such as the orchestrator component 1212, the API provider component 818, the LLM agent component 820, the skill component 822, the TTS component 824, the context handler component 826, etc.) In some embodiments, the APIs may correspond to the components.

The API retrieval component 1006 may use retrieval-based approaches to retrieve the one or more relevant APIs from the index storage 1012, which may store various information associated with multiple APIs (and/or components) such as component descriptions, API arguments (e.g., parameter inputs/outputs), identifiers for components (e.g., such as the API provider component 818, the LLM agent component 820, the skill component 822, the TTS component 824, the context handler component 826, etc.) that provides the API, etc. For example, the API retrieval component 1006 may compare one or more APIs (and/or components) included in the index storage 1012 to the user input or the current task to determine one or more APIs (or components) (top-k) that corresponds to the user input or the current task (e.g., APIs (and/or components) that are semantically similar to the user input or the current task, APIs (and/or components) that are capable of performing the current task, etc.). In some embodiments, the API retrieval component 1006 (or another component of the API retrieval component 1006) may determine an encoded representation of the user input or the current task and compare (e.g., using cosine similarity) the encoded representation(s) to an encoded representation of a component description for the API (and/or component) to determine whether the API (and/or component) is semantically similar to the user input or the current task. A component description may correspond to a description of the one or more function that the API (and/or component) is configured to perform and/or other information associated with the API (and/or component) (e.g., an API call formatting structure (e.g., including input parameters), historical accuracy/defect rate, historical latency value, etc.). In some embodiments, the component description may further include one or more exemplars associated with use of the API (and/or component) (e.g., an example user input, corresponding API call, and example API output). If the value of semantic similarity meets or exceeds a threshold, the API (and/or component) (and, optionally, the component description) may be included in the relevant API data 1008. In some embodiments, the API retrieval component 1006 may determine the relevant API data 1008 further using contextual information, including the context data 902, an accuracy/defect rate value associated with the APIs (and/or components), and/or a historical latency value associated with the APIs (and/or components) (e.g., which may be included in the description of the API). In some embodiments, the index storage 1012 may be included in the API retrieval component 1006. Similar processing may be performed to determine one or more components that are semantically similar to the user input or the current task, which may be included in the relevant API data 1008. The API retrieval may send the relevant API data 1008 to the shortlister prompt generation component 1002.

In some embodiments, the prompt data 1004 may be an instruction for the shortlister language model 1010 to determine one or more APIs (and/or components) that are to process with respect to the user input or the current task (e.g., determine one or more API calls to cause the APIs (and/or components) to process) given the information (e.g., the user input data 804, the context data 902, the current task, and the relevant API data 1008). As discussed herein above, in some embodiments the prompt generation component 904 may corresponding to the shortlister prompt generation component 1002. As such, in some embodiments, the shortlister prompt generation component 1002 may, in addition to the processing discussed herein below, process similar to the prompt generation component 904 (e.g., to generate prompt data for input to an LLM configured to generate a request for context data).

For example, for the selected task of "turn on all of the lights except the garage light" and corresponding relevant API data, the shortlister prompt generation component 1002 may generate example prompt data 1004:
{
Find an execute an API to complete the task of turn on all of the lights except the garage light
Here is a list of relevant API available:
Let's chat API
Classic NLU API
Smart Home skill
If no appropriate API is found, summarize as nothing is found.
}

For further example, for the selected task of "Identify user pizza preference" (or some other related context retrieval task) and corresponding relevant API data, the shortlister prompt generation component 1002 may generate example prompt data 1004:
{
Find an execute an API to complete the task of identifying the user's pizza preference
Here is a list of relevant API available:
Context Handler API
If no appropriate API is found, summarize as nothing is found.
}

As another example, for the subsequently selected task of "find application to order pizza" and corresponding relevant API data, the shortlister prompt generation component 1002 may generate example prompt data 1004:
{
Find and execute an API to complete the task of find application to order pizza
Here is a list of relevant API available;
Let's chat API
[Food Ordering Application 1] API
[Food Ordering Application 2] API
If no appropriate API is found, summarize as nothing is found.
}

In some embodiments, the shortlister prompt generation component 1002 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The shortlister language model 1010 processes the prompt data 1004 to generate one or more API calls corresponding to request(s) that the corresponding APIs (and/or components) return a potential response to the user input/current task and/or a potential action(s) that the APIs (and/or components) are configured to/will perform with respect to the user input and/or the current task (e.g., a natural language description of the potential action(s)). In some embodiments, the shortlister language model 1010 may generate API calls for a subset of the APIs represented in the prompt data 1004. For example, based on processing the first example prompt data provided above, the shortlister language model 1010 may output model output data: {"Use Let's chat API to turn on all of the lights except the garage light, Use Smart Home skill to turn on all of the lights except the garage light"}, {"Letschat ("turn on all of the lights except the garage light"), or the like. For further example, based on processing the second example prompt data provided above, the shortlister language model 1010 may output model output data: {" retrieve context to identify user's pizza preference, "} or the like. As another example, based on processing the third example prompt data provided above, the shortlister language model 1010 may output model output data: {" Use [Food Ordering Application 1] to order pizza, Use [Food Ordering Application 2] to order pizza, "} or the like.

As discussed herein above, in some embodiments, the LLM may correspond to the shortlister language model 1010. In such embodiments, the shortlister language model 1010 may, in addition to the processing discussed herein with respect to FIG. 10, process similar to the LLM. For example, the shortlister language model 1010 may be configured to generate a request for the context handler component 826 to retrieve context data relevant to the user input data 804 and/or one or more of the tasks. For further example, the shortlister language model 1010 may be configured to generate a request for the context handler component 826 to store context data, such as in response to a corresponding task and/or in response to a request from the response arbitration component 834.

The shortlister language model 1010 may generate the one or more APIs calls (including the required input parameters) by applying in-context learning for cold-starting API calls (e.g., one-shot/few-shot learning). For example, in embodiments where the relevant API data 1008 includes the component descriptions, the shortlister language model 1010 may use the one or more exemplars included in the component descriptions (included in the prompt data 1004) to determine the one or more input parameters for the API call. In some embodiments, the shortlister language model 1010 may be finetuned on such exemplars (e.g., during offline or runtime processing), such that the shortlister language model 1010 is capable of determining the one or more input parameters for the given API call.

During processing of the shortlister language model 1010 and after generating the one or more requests, the shortlister language model 1010 may cause the one or more requests to be executed. For example, as shown in FIG. 10, the shortlister language model 1010 may send action plan data 814 representing the one or more requests to the action plan execution component 816, which causes execution of the one or more requests included in the action plan data 814. For example, the action plan execution component 816 may process the action plan data 814 to generate action data 817. Action data 817 may represent, for example, an instruction (e.g., an executable API call determined from/generated based on the action plan data 814) for a particular API to process with respect to the user input and/or the current task. In embodiments where the action plan data 814 includes requests corresponding to incomplete API calls, API call formats, indications of actions to be performed by one or more components, the action plan execution component 816 may be configured to generate executable API calls corresponding to the action plan data 814. In some embodiments, the action plan execution component 816 may generate the action data 817 to represent an instruction to provide the responses including the potential response(s)/potential action(s) with respect to the user input and/or the current task.

In some embodiments, the shortlister language model 1010 may send model output data including the one or more requests to another component of the LLM orchestrator component 812, which may be configured to parse the model output data to identify the one or more requests. Thereafter, the component may generate the action plan data 814 representing the one or more requests and send the action plan data 814 to the action plan execution component 816.

The action plan execution component 816 may send the action data 817 to the API provider component 818, the LLM agent component 820, the skill component 822, the TTS component 824, and/or the context handler component 826. The API provider component may include one or more components (e.g., rule-based components, ML-based components, LLM-based components, or the like) that may be caused to process using the action data 817 (e.g., using the API calls generated by the LLM shortlister component 808).

The TTS component 824 may be configured to process textual or tokenized input to generate audio data representing synthesized speech corresponding to the textual or tokenized input spoken by a synthetic voice. The processing of the TTS component 824 is discussed in detail below with respect to FIG. 12.

The skill component 822 may be software running on the system component(s) 104 that is akin to a software application. That is, a skill component 822 may enable the system component(s) 104 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 104 may be configured with more than one skill component 822. For example, a weather service skill component may enable the system component(s) 104 to provide weather information, a car service skill component may enable the system component(s) 104 to book a trip with respect to a taxi or ride sharing service, a restaurant skill component may enable the system component(s) 104 to order a pizza with respect to the restaurant's online ordering system, etc. A skill component 822 may operate in conjunction between the system component(s) 104 and other devices, such as the user device 102, in order to complete certain functions. A skill component 822 may include hardware, software, firmware, or the like that may be dedicated to a particular skill component 822 or shared among different skill components 822.

The LLM agent component 820 may correspond to one or more LLM agents. An LLM agent component 820 may correspond to a custom instantiation of an LLM (and other components) that is configured to handle user inputs relating to a particular domain/functionality. In some embodiments, the LLM agent component 820 may be configured to handle specific use cases via particular prompt generation, finetuning of the LLM, etc. For example, the LLM agent component 820 may be configured to handle user inputs/tasks related to information query, the LLM agent component 820 may be configured handle user inputs/tasks related to shopping, the LLM agent component 820 may be configured to handle user inputs/tasks related to ordering food from various restaurants, the LLM agent component 820 may be configured to handle user inputs/tasks related to ordering food from a particular restaurant (e.g., a particular pizza restaurant), the LLM agent component 820 may be configured to handle user inputs/tasks related to booking a hotel, the LLM agent component 82 Of may be configured to handle user inputs/tasks related to booking a flight, etc.

The API provider component 818 may include various components that may be caused to execute using the action data 817. For example, the API provider component 818 may include an entity recognition (ER) component, which may be configured to process textual or tokenized input to link one or more entity references included in the textual or tokenized input to a specific corresponding entity known to the system 800. For example, based on the textual or tokenized input (e.g., a context of the textual or tokenized input), the ER component may determine that a reference to "Neil Armstrong" is directed to the American astronaut. In some embodiments, the action data 817 may include an indication(s) (e.g., slots) of one or more entities included in the user input, as determined by one or more of the language models described with respect to FIG. 9, in which case the ER component may process to link the one or more entities to the specific, referenced, entity known to the system 800.

In other embodiments, the ER component may be configured to process the action data 817 to determine the one or more entities included in the user input and link the one or more determined entities to the specific, referenced, entity (entities) known to the system 800. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component 818 may include a search component, which may be configured to query a storage (e.g., a database, repository, knowledge base, etc.) for information usable for generating a response to a user input. For example, if the action data 817 represents a request for information of "Who won the game between [Team] Name] and [Team 2 Name]," then the search component may query the storage (or other sources, such as the Internet), to retrieve the information "[Team] Name] won the game between [Team 1 Name] and [Team 2 Name]."

As an even further example, the API provider component 818 may include the device controller component discussed herein above, which may be further configured to cause a device to perform an action corresponding to the action data 817.

In some embodiments, the API provider component 818 may include a domain service component, which may be configured for interacting with one or more services defined by particular users, such as developers, specialists, or the like (e.g., to receive information, such as responses or annotations, to cause an action.

One or more of abovementioned components may send action response data 828 representing one or more potential responses generated by the one or more APIs corresponding to the action data 817 (e.g., the potential response(s) and/or potential action(s)) to the action plan execution component 816. For example, in response to an API call to the skill component 822 associated with a user input for turning on a light, the action response data 828 may correspond to a potential action of "turn on the light," or the like. For further example, in response to an API call to the context handler component 826 associated with retrieving context for a user input for ordering pizza, the action response data 828 may correspond to context data representing the user has previously indicated that they prefer Brooklyn style pizza. For further example, in response to an API call to the skill component 822 associated with a user input for ordering a pizza from a particular restaurant, the action response data 828 may correspond to a potential action of "order medium pizza from [restaurant name]", or the like. The action plan execution component 816 may send the action response data 828 to the shortlister language model 1010.

In some embodiments, the action plan execution component 816 may send the action response data 828 to the shortlister prompt generation component 1002, which may generate further prompt data including the action response data 828 and be sent to the shortlister language model 1010. For example, the further prompt data may be generated based on combining the prompt data 1004 and the action response data 828.

In some embodiments, the shortlister language model 1010 may process the action response data 828 (or the further prompt data including action response data 828) to generate a natural language summary of the action response data (e.g., the potential response data 830). In some embodiments, the potential response data 830 may include an association between action response data 828 (or a summarized representation of the action response data 828) and an indication of the API/component that generated the action response data 828 (e.g., a component identifier, component description, etc.). In some embodiments, the shortlister language model 1010 may be configured to filter and/or rank the action response data 828 based on how relevant the action response data 828 is to the current task. In some embodiments, the shortlister language model 1010 may be configured to filter and/or rank the action response data 828 based on a confidence level of the component that provided the action response data, where the confidence level may indicate a likelihood of the component being able to respond (e.g., within a period of time), the component being able to perform a potential action that corresponds to the current task, etc. In some embodiments, the action response data 828 may indicate whether or not the corresponding component is able to respond (e.g., the action response data 828 may include a Boolean value such as "yes" or "no" or other similar indications). In some embodiments, the shortlister language model 1010 may filter and/or rank the action response data 828 based on information included in the prompt data 1004 (e.g., the user input data 804, the relevant API data 1008, the context data 902, the prompt data 906, etc.). For example, the potential response data 830 may include a subset of the action response data 828 (or the summarized representations of the action response data 828) and may further include a representation of a confidence associated with the action response data 828 (or a summarized representation of the action response data 828). As such, the potential response data 830 may further include data representing a confidence of how relevant the action response data 828 is to the current task. In some embodiments, the shortlister language model 1010 may consider a rating associated with the component that provided the action response data 828, where the rating may be a user satisfaction rating provided by multiple different users of the system 800, a user satisfaction rating provided by the user 802 associated with the user input data 804, a system generated rating based on the number of past tasks handled by the component, an accuracy rating based on the number of past tasks the component had handled correctly/provided a desired response for, etc.

The LLM shortlister component 808 may send the potential response data 830 for further processing. In instances where the task generation component 806 determined that more than one task is to be completed, the LLM shortlister component 808 may send the potential response data 830 to the task generation component 806, which may process as described herein above to maintain and prioritize the task list based on the potential response data 830 and select a new task to be completed. For example, in the instance where the selected task was "identify user's pizza preference," or some other context retrieval task, the shortlister language model 1010 may send potential response data 828 corresponding to the context data retrieved by the context handler component 826 to the task generation component 806, to process as described herein above with respect to FIG. 9.

In instances where the task generation component 806 determined that only one task is to be completed, or in instances where the LLM shortlister component 808 determines that there are no remaining tasks to be completed, the LLM shortlister may send the potential response data 830, and the potential responses associated with previously completed tasks (e.g., previous action response data) to the response arbitration component 834 to process as discussed herein above. The LLM shortlister component 808 may further send the user input data 804, the context data 902, etc., to the task generation component 806 and/or the response arbitration component 834.

As discussed herein above, in some embodiments, the LLM orchestrator component 812 may further include a memory storage which may store various information associated with the processing performed. In addition, or alternative, the memory storage may store any of the additional information discussed herein above that was determined/generated during one or more previous iterations of processing by the LLM orchestrator component 812 for the user input data 804 (e.g., the user input data 804, the prompt data 906, the context data 902, the model output data 910, prompt data 914, the task data 810, the relevant API data 1008, the prompt data 1004, the action plan data 814, the action response data 828, the potential response data 830, etc.). As such, after the LLM shortlister component 808 generates the potential response data 830, the LLM orchestrator component 812 may send the abovementioned data to the memory storage. In some embodiments, the above-mentioned data may be sent to the memory storage as it is generated by the system 800.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the task prompt generation component 904 may receive one or more portions of the data included in the memory storage (which were generated during one or more previous iterations of processing performed with respect to the user input data 804) and include the one or more portions of data in the prompt data 906.

Figure 11:
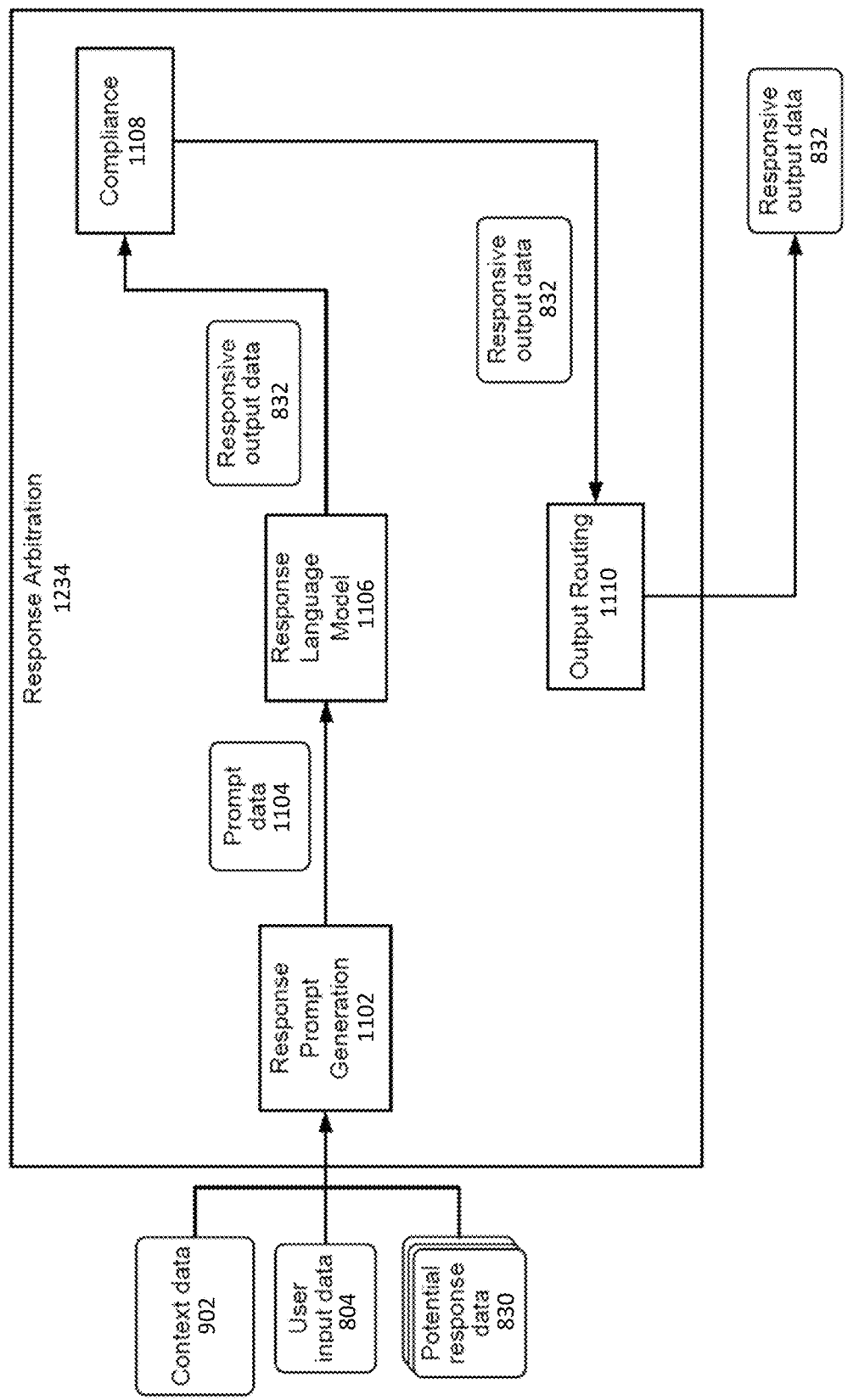
FIG. 11 is a conceptual diagram illustrating example component and processing of a response arbitration component, according to embodiments of the present disclosure.

FIG. 11 illustrates example components and processing of the response arbitration component 834. As shown in FIG. 11, the response arbitration component 834 may include a response prompt generation component 1102, a response language model 1106, a compliance component 1108, and an output routing component 1110. As discussed herein above, the response arbitration component 834 processes the potential response data 830 (representing the potential responses generated by the one or more components determined to be associated with the user input) to determine whether one or more of the potential responses generated by the system 800 are responsive to the user input. The response arbitration component 834 may then generate the natural language response to the user input.

As shown in FIG. 11, the response arbitration component 834 receives the user input data 804, the context data 902, and/or the potential response data 830 (output by the LLM shortlister component 808) at the response prompt generation component 1102. As discussed herein above, in some embodiments, the prompt generation component 904 may correspond to the response prompt generation component 1102. In such embodiments, the response prompt generation component 1102 may, in addition to the processing described herein below, process similarly to the prompt generation component 904 (e.g., to generate prompt data to be processed to generate a response to a user input).

The response prompt generation component 1102 may process the user input data 804, the context data 902, and the potential response data 830 (and, optionally, the further information received from the LLM shortlister component 808) to generate prompt data 1104 representing a prompt for input to the response language model 1106. In some embodiments, the prompt data 1104 may be an instruction for the response language model 1106 to determine whether one or more of the potential responses represented in the potential response data 830 are responsive to the user input given the other information (e.g., the context data 902, the potential responses associated with the previous tasks (e.g., previous action response data) associated with the user input, and the user input data 804) included in the prompt data 1104. The prompt data 1104 may further be an instruction for the response language model 1106 to, if the response language model 1106 determines that one or more of the potential responses are responsive to the user input, cause performance of the one or more corresponding actions (e.g., the one or more potential actions included in the selected responses) and/or cause the system 800 to inform the user 802 of the one or more selected responses. For example, in some embodiments, prompt data 1104 may further instruct the response language model 1106 to generate a natural language summary of the one or more selected responses determined to be responsive to the user input. The prompt data 1104 may instruct the response language model 1106 to cause the system 800 to output the natural language summary to the user 802.

In some embodiments, the prompt data 1104 may further be an instruction for the response language model 1106 to, if the response language model 1106 determines that none of the potential responses are responsive to the user input, generate a request for additional information (e.g., further context data) from a component (e.g., the context handler component 826) of the system 800 and/or the user 802. The additional information may be any information usable to determine and/or perform an action responsive to the user input (e.g., to resolve an ambiguity associated with the user input and/or a task(s) associated with the user input), such as further context data relevant to the user input data 804 and/or the potential response data 830. In some embodiments, the response language model 1106 may perform certain steps/intermediate steps such as "Think," "Act," and/or "Response," as discussed herein above.

For example, for the example user input of "What is the weather for today" and corresponding potential responses output by the LLM shortlister component 808, the response prompt generation component 1102 may generate example prompt data 1104:

{
"If applicable, summarize the responses that satisfy the user's request. If applicable, call the corresponding API's to perform the potential actions that satisfy the user's request. If no response is needed, indicate that."
Here is the user's request:
What is the weather for today
Here are the potential responses and potential actions:
Skill component A: It is currently 70 degrees, with a high of 75 and a low of 68
Skill component B: The weather for today is expected to be mostly sunny, but with a chance of rain in the late afternoon
}

For further example, for the example user input of "please order some pizza for dinner" and corresponding potential responses output by the LLM shortlister component 808, the response prompt generation component 1102 may generate example prompt data 1104:

{
Here is the user's request:
Please order some pizza for dinner
Here is the context:
Component A: User ordered Brooklyn style pizza from [Pizza
Company 1 Name]
Here are the potential responses and potential actions:
[Food Ordering Application 1] API: Use [Food Ordering Application 1] to order pizza from [Pizza Company 1 Name]
[Food Ordering Application 2] API: Use [Food Ordering Application 2] to order pizza from [Pizza Company 2 Name]
}

In some embodiments, the response prompt generation component 1102 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 1104 may include "Please generate a polite, respectful, and safe response and one that does not violate protected class policy."

The response language model 1106 processes the prompt data 1104 to generate the responsive output data 832 representing the one or more selected responses determined to be responsive to the user input, the natural language summary of the one or more selected responses, and/or the request for additional information.

If the response language model 1106 determines that one or more of the potential responses are responsive to the user input, the response language model 1106 may generate the responsive output data 832 to represent the one or more selected responses or a natural language summary of the one or more selected responses to be output to the user. For example, based on processing the first example prompt data above, the response language model 1106 may select one of the potential responses (e.g., the potential responses from skill component A (e.g., a weather skill component)) determined to be responsive to the user input to generate responsive output data 832: {"It is currently 70 degrees, with a high of 75 and a low of 68,"} or the like. For further example, based on processing the first example prompt data provided above, the response language model 1106 may select more than one of the potential responses (e.g., the potential responses from both the skill component A and skill component B) determined to be responsive to the user input and generate a summary of the selected responses to generate responsive output data 832: {"It is expected to be mostly sunny today, with a high of 75 and a low of 68, but with a chance of rain in the late afternoon,"} or the like.

As another example, based on processing the second example prompt data provided above, the response language model 1106 may select one of the potential responses (e.g., the potential response from Component A (e.g., the context data received from the context handler component 826) representing that the user ordered Brooklyn style pizza from [Pizza Company 1 Name]) determined to be responsive to the user input to generate responsive output data 832: {"Ok, I will place an order for Brooklyn style pizza from [Pizza Company 1 Name],"} or the like. As a further example, based on processing the second example prompt data provided above, the response language model 1106 may select more than one of the potential responses (e.g., the potential responses from both component A and API A) determined to be responsive to the user input and generate a summary of the selected responses to generate the responsive output data 832: {"Ok, I will place an order for Brooklyn style pizza from [Pizza Company 1 Name] using [Food Ordering Application 1] API,"} or the like.

As such, the response language model 1106 may select between the one or more potential responses from one or more different components (e.g., for the first example prompt data, the potential responses from the skill component A and the skill component B and, for the second example prompt data, the potential responses from Component A, API A, and API B) to determine that a subset of the potential responses are responsive to the user input. Thereafter, the response language model 1106 may cause output of the selected responses (e.g., the subset of potential responses) or a natural language summary of the selected responses to the user.

In some embodiments, the response arbitration component 834 may also generate and send an instruction to the components, (e.g., API(s), components, agents, etc.) configured to perform the potential actions included in the selected responses to cause performance of the potential actions (or another component of the system 800 configured to cause the components to perform the potential actions, such as the action plan execution component 816, which is discussed in more detail herein below). For example, in instances where the selected responses include a potential action to be performed, the response language model 1106 may further cause the corresponding components to perform the potential action (e.g., cause [Food Ordering Application 1] API to order the Brooklyn style pizza from [Pizza Company 1 Name] using [Food Ordering Application 1]). In other embodiments, the system 800 may not generate and/or send the instruction until approval to perform the action(s) is received from the user 802.

In some embodiments, the response arbitration component 834 may also generate and send an instruction to the context handler component 826 (or the LLM shortlister component 808) to store (or cause the context handler component 826 to store) context data (e.g., the context data 902) associated with the processing performed to generate the responsive output data 832.

If the response language model 1106 determines that none of the potential responses are responsive to the user input and/or that an ambiguity exists with respect to the user input and/or one or more of the determined tasks, the response language model 1106 may generate the responsive output data 832 to represent a request to be output to the user and/or the context handler component 826. For example, based on processing the first example prompt data provided above, the response language model 1106 may determine an ambiguity exists with respect to the size of the pizza to be ordered and may generate the responsive output data 832: {"What size pizza should I order?",} {"What size pizza does the user usually order?",} or the like to be output to the user and/or sent to the context handler component 826.

The response language model 1106 may send the responsive output data 832 to the compliance component 1108, which is configured to determine whether model output data generated by the response language model 1106 is appropriate for output to the user 802. In other words, the compliance component 1108 processes the responsive output data 832 to determine whether the responsive output data 832 includes any inappropriate/sensitive information that should not be output to the user 802 (e.g., confidential information, offensive language, etc.). In some embodiments, the compliance component 1108 may be configured to compare the responsive output data 832 to one or more words determined to be inappropriate/sensitive and should not be output to the user 802. In some embodiments, the compliance component 1108 may include/implement an ML model. For example, the ML model may process the responsive output data 832 to determine whether the responsive output data 832 includes any inappropriate/sensitive information. During training, the ML model may take as input a plurality of training natural language inputs, where the ML model is tasked with classifying a natural language input as including inappropriate/sensitive information or not. The output of the ML model (e.g., 0, 1, a value between ( ) and 1, or the like) resulting from processing with respect to a training natural language input may be compared to a corresponding label representing whether the natural language input includes inappropriate/sensitive information or not. Based on the comparison, one or more parameters of the ML may be configured. In some embodiments, the ML model may be a classifier.

If the output of the compliance component 1108 indicates that the responsive output data 832 includes information that is not appropriate for output to the user 802, the compliance component 1108 may cause further processing of the responsive output data 832 by downstream components to halt. In some embodiments, the response arbitration component 834 may cause the response language model 1106 to generate new responsive output data to be evaluated by the compliance component 1108. For example, the response arbitration component 834 may cause the response prompt generation component 1102 to generate new prompt data, which may include the prompt data 1104, the responsive output data 832, and an indication that the responsive output data 832 is not appropriate for output to the user 802. The new prompt data may be an instruction to generate new model output data that is appropriate for output to the user 802.

If the output of the compliance component 1108 indicates that the responsive output data 832 are appropriate for output to the user, the compliance component 1108 may send the responsive output data 832 to the output routing component 1110. The output routing component 1110 processes the responsive output data 832 to determine one or more components that are to be caused to process in response to the responsive output data 832. In other words, the output routing component 1110 parses the responsive output data 832 to determine one or more components that the responsive output data 832 is to be routed to (or that are to be caused to process based on the responsive output data 832).

For example, in an instance where the response language model 1106 determines that one or more of the potential responses are responsive to the user input and generates the responsive output data 832 including the one or more selected responses (or a natural language summary of the one or more selected responses)/the request for additional information, the output routing component 1110 may parse the responsive output data 832 to determine the selected responses/the natural language summary and send the responsive output data 832 to a component configured to generate corresponding data to be output to the user 802. For example, the output routing component 1110 may send the responsive output data 832 to the TTS component 824, which may process as described herein above to generate output audio data including synthesized speech corresponding to the responsive output data 832, which the system 800 may send to the user device 102 for output to the user 802. In some embodiments, the system 800 may further include a component configured to generate visual output data (e.g., output image and/or video data) corresponding to the responsive output data 832, which may be sent to the user device 102 to be output to the user.

For further example, in embodiments where the responsive output data 832 includes selected responses (e.g., the responsive output data 832) that include one or more potential actions to be performed, the output routing component 1110 may process as described herein above to determine the one or more selected responses/the natural language summary and send the responsive output data 832 to the one or more components associated with the selected responses. In such embodiments, the responsive output data 832 may further include an instruction for the one or more components to perform the potential actions corresponding to the selected responses. For example, in some embodiments, the components corresponding to the potential responses included in the potential response data 830 may, after generating the potential responses, suspend processing required to perform the potential action included in the potential responses and await an instruction from the system 800 to perform the potential action. As such, the output routing component 1110 may include the instruction in the responsive output data 832 to cause the component to perform the potential action. In some embodiments, the output routing component 1110 may generate an API call configured to cause the component to perform the action.

In some embodiments, where the responsive output data 832 includes selected responses that include one or more potential actions to be performed, the responsive output data 832 may further request authorization from the user 802 to perform the one or more potential actions responsive to the user input. After receiving the request authorization (e.g., via a subsequent user input) the response arbitration component 834 may generate and send the corresponding instruction (or API call) to perform the one or more potential actions responsive to the user input. In some embodiments, the system 800 may store data indicating prior authorization to perform the one or more potential actions responsive to the user input (or one or more actions similar to the one or more potential actions), in which case the response arbitration component 834 may use such data as authorization to perform the one or more potential actions. For example, the user 802 may have previously provided authorization for a set of actions (e.g., turning on outside lights). Thereafter, the system 800 may determine the one or more potential actions to be performed in response to the user input data 804. If the system 800 determines that the one or more actions are included in the set of actions previously authorized by the user 802, the system 800 may not ask for further authorization prior to causing the one or more potential actions to be performed.

For further example, in an instance where the response language model 1106 generates the responsive output data 832 including a request for additional information (in response to the response language model 1106 determining that none of the potential responses are responsive to the user input and/or further context data relevant to the user input, one or more of the tasks, and/or the potential responses is needed), which may be determined by the output routing component 1110 based on, for example, the responsive output data 832 including a question, the output routing component 1110 may parse the responsive output data 832 to determine whether the request for additional information is to be sent to the context handler component 826 and/or output to the user 802. In some embodiments, the response language model 1106 may include in the responsive output data 832 an indication of whether the request for additional information should be sent to the context handler component 826 and/or output to the user 802. In some embodiments, unless otherwise indicated in the responsive output data 832, the output routing component 1110 may determine to send the request for additional information to the context handler component 826 prior to outputting the request for additional information to the user 802. In the instance where the context handler component 826 is unable to determine relevant context data (or a component of the system 800 is unable to resolve the ambiguity using the context data received from the context handler component 826), the output routing component 1110 may determine the request for additional information is to be output to the user 802.

In some embodiments, the response arbitration component 834 may be configured to further process data representing a potential response to the user input that is generated by one or more other components of the system 800 not included in the LLM orchestrator component 812. For example, the response arbitration component 834 may further receive data from an orchestrator component 1212 (discussed in detail herein below with respect to FIG. 12) representing a potential response to the user input (e.g., the output of the skill component 822), where the orchestration of the processing performed to generate the potential response was performed by the orchestrator component 1212, rather than the LLM orchestrator component 812. In such embodiments, the response arbitration component 834 may be further configured to arbitrate between first potential responses received as a result of the processing of the LLM orchestrator component 812 and second potential responses received as a result of the processing of the orchestrator component 1212. As discussed above, the response arbitration component 834 may select one or more portions (e.g., potential actions, potential responses, etc.) of the first potential responses and/or the second potential responses that are determined to be responsive to the user input and cause output of the one or more portions (or a summarized representation of the one or more portions) and/or performance of the potential actions corresponding to the selected responses.

In some embodiments, the data received from the orchestrator component 1212 may be included in the potential response data 830. For example, the orchestrator component 1212 may be determined to be configured to perform a function (e.g., cause another component(s) to perform a function) potentially relevant to the user input such that the LLM shortlister component 808 may cause the orchestrator component 1212 to generate potential responses potentially responsive to the user input, which may be included in the potential response data 830 sent to the response arbitration component 834.

In some embodiments, the language models of FIGS. 9, 10, and/or 11 may be fine-tuned to perform a particular task(s). Fine-tuning of the language models may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, as discussed above, one or more components of the system 800 discussed herein above may be configured to begin processing with respect to data as soon as the data or a portion of the data is available to the one or more components. Some components of the system 800 are generative components/models that can begin processing with respect to portions of data as they are available, instead of waiting to initiate processing after the entirety of data is available. In other words, the system 800 may be configured to stream portions of data associated with processing with respect to a user input to the one or more components such that the one or more components may begin performing their configured processing with respect to that data as soon as it is available to the one or more components. For example, if the output of the task determination language model 908, the task selection language model 916, and/or the shortlister language model 1010 indicates that additional information is needed to complete a first task associated with a user input, a request for the additional information may be sent to the context handler component 826. Thereafter, the task determination language model 908, the task selection language model 916, and/or the shortlister language model 1010 may continue to process to complete their configured operations. For example, while the context handler component 826 is processing to determine the context data, the system 800 may begin processing with respect to a second task associated with the user input. Thereafter, the output of the context handler component 826 may be sent to the response arbitration component 834 such that once the response arbitration component 834 receives the output of the LLM shortlister component 808, the response arbitration component 834 may resolve the ambiguity that resulted in the request for the context data in order to generate the responsive output data 832. For further example, if the user input data 804 is generated to include the natural language representation of the user input, but the processing required to determine the corresponding contextual signals (e.g., weather data, time of data, dialog history, device information, etc.) is yet to be completed, the task generation component 806 may begin processing with respect to the natural language representation of the user input. Once the corresponding contextual signals have been generated, the task generation component 806 may begin processing with respect to the contextual signals and may update downstream components with the result of the processing with respect to the contextual signals.

As another example, if the task generation component 806 determines that more than one task is to be completed to perform an action responsive to a user input, and the LLM shortlister component 808 processes as described herein above to cause one or more components to generate potential responses with respect to a first task of the more than one tasks, the LLM shortlister component 808 may send the potential responses (and a representation of the user input and the current task) to the response arbitration component 834 to process as described herein above with respect to those potential responses while the system 800 (e.g., the task generation component 806 and/or the LLM shortlister component 808) completes processing with respect to the remaining tasks of the one or more tasks. Therefore, the response arbitration component 834 may process as described herein to select between the potential responses associated with the first task while the potential responses associated with one or more of the remaining tasks is completed. As such, the response arbitration component 834 may only need to arbitrate between the potential responses associated with the first task that were previously selected by the response arbitration component 834 as being responsive to the first task when the response arbitration component 834 later processes with respect to further potential responses associated with further tasks.

As a further example, if the API retrieval component 1006 determines (e.g., with a confidence value that meets or exceeds a particular threshold) that a particular API or component description should be included in the relevant API data, the API retrieval component 1006 may provide the corresponding relevant API data to the shortlister prompt generation component 1002 so that the shortlister prompt generation component 1002 may begin processing with respect to the relevant API data while the API retrieval component 1006 continues to determine one or more further relevant API data. In general, the system 800 is capable of performing such streaming and processing of portions of data discussed herein (e.g., for processing with respect to a user input) and updating downstream components with the results of processing of newly available portions of data as the data becomes available for processing.

Figure 12:
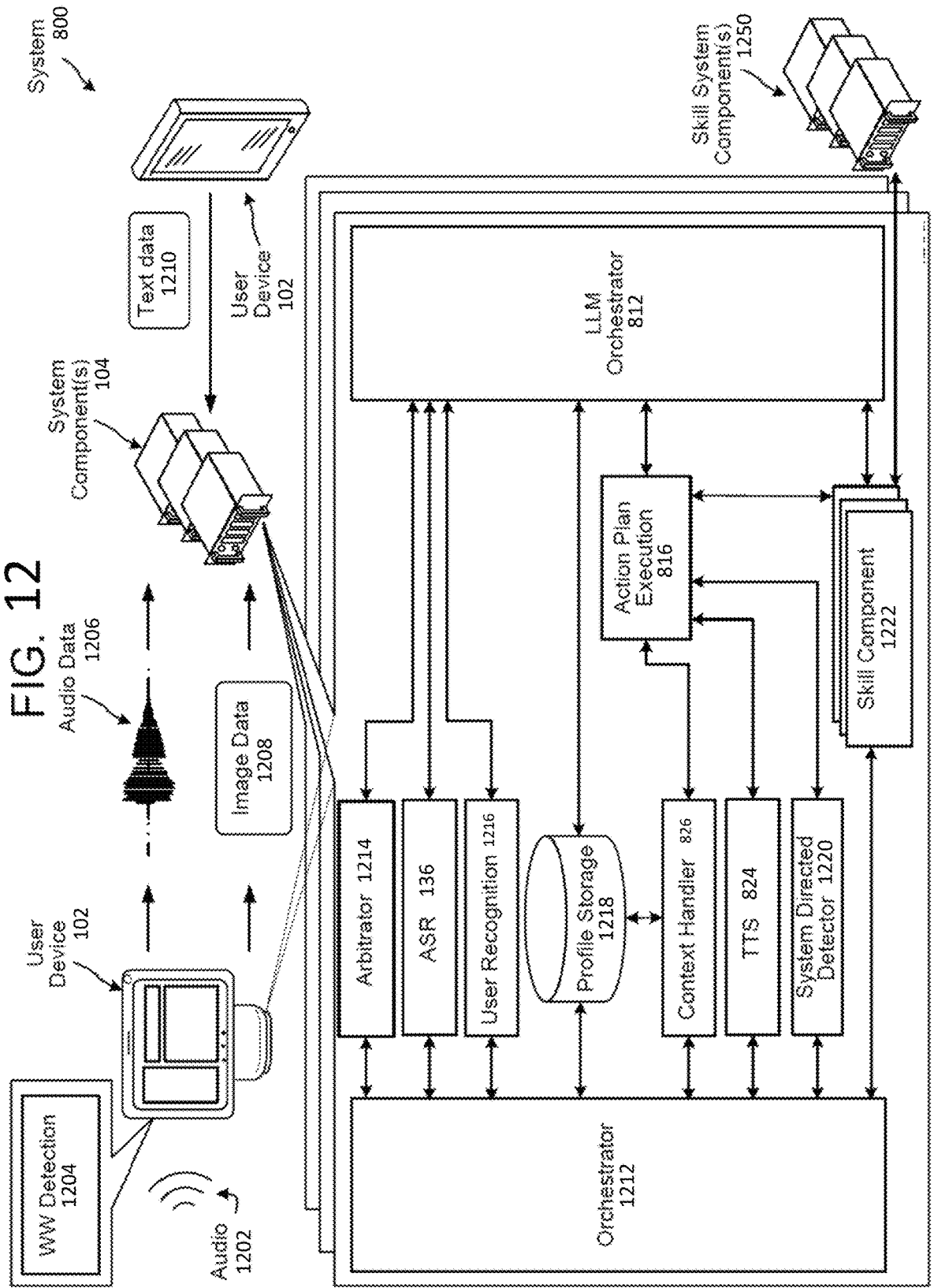
FIG. 12 is a conceptual diagram of components of the system, according to embodiments of the present disclosure.

The system 800 may operate using various components as described in FIG. 12. The various components may be located on same or different physical devices. Communication between various components may occur directly or across a networks(s) 106. The user device 102 may include audio capture component(s), such as a microphone or array of microphones of a user device 102, captures audio 1202 and creates corresponding audio data. Once speech is detected in audio data representing the audio 1202, the user device 102 may determine if the speech is directed at the user device 102/system component(s). In at least some embodiments, such determination may be made using a wakeword detection component 1204. The wakeword detection component 1204 may be configured to detect various wakewords. In at least some examples, each wakeword may correspond to a name of a different digital assistant. An example wakeword/digital assistant name is "Alexa." In another example, input to the system may be in form of text data 1210, for example as a result of a user typing an input into a user interface of user device 102. Other input forms may include indication that the user has pressed a physical or virtual button on user device 102, the user has made a gesture, etc. The user device 102 may also capture images using camera(s) of the user device 102 and may send image data 1208 representing those image(s) to the system component(s). The image data 1208 may include raw image data or image data processed by the user device 102 before sending to the system component(s). The image data 1208 may be used in various manners by different components of the system to perform operations such as determining whether a user is directing an utterance to the system, interpreting a user command, responding to a user command, etc.

The wakeword detection component 1204 of the user device 102 may process the audio data, representing the audio 1202, to determine whether speech is represented therein. The user device 102 may use various techniques to determine whether the audio data includes speech. In some examples, the user device 102 may apply voice-activity detection (VAD) techniques. Such techniques may determine whether speech is present in audio data based on various quantitative aspects of the audio data, such as the spectral slope between one or more frames of the audio data: the energy levels of the audio data in one or more spectral bands: the signal-to-noise ratios of the audio data in one or more spectral bands: or other quantitative aspects. In other examples, the user device 102 may implement a classifier configured to distinguish speech from background noise. The classifier may be implemented by techniques such as linear classifiers, support vector machines, and decision trees. In still other examples, the user device 102 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 1202, is analyzed to determine if specific characteristics of the audio data match preconfigured acoustic waveforms, audio signatures, or other data corresponding to a wakeword.

Thus, the wakeword detection component 1204 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wake-word detection component 1204 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 1204 and/or input is detected by an input detector, the user device 102 may "wake" and begin transmitting audio data 1206, representing the audio 1202, to the system component(s) 104. The audio data 1206 may include data corresponding to the wakeword: in other embodiments, the portion of the audio corresponding to the wakeword is removed by the user device 102 prior to sending the audio data 1206 to the system component(s) 104. In the case of touch input detection or gesture-based input detection, the audio data may not include a wake-word.

In some implementations, the system 800 may include more than one system component(s). The system component(s) 104 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 1204 may result in sending audio data to system component(s) for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 1222 of one or more system component(s) 104.

The user device 102/system component(s) may also include a system directed input detector 1220. The system directed input detector 1220 may be configured to determine whether an input to the system (for example speech, a gesture, etc.) is directed to the system or not directed to the system (for example directed to another user, etc.). The system directed input detector 1220 may work in conjunction with the wakeword detection component 1204. If the system directed input detector 1220 determines an input is directed to the system, the user device 102 may "wake" and begin sending captured data for further processing. If data is being processed the user device 102 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 1220 determines an input is not directed to the system (such as a speech or gesture directed to another user) the user device 102 may discard the data and take no further action for processing purposes. In this way the system 800 may prevent processing of data not directed to the system, thus protecting user privacy. As an indicator to the user, however, the system may output an audio, visual, or other indicator when the system directed input detector 1220 is determining whether an input is potentially device directed. For example, the system may output an orange indicator while considering an input, and may output a green indicator if a system directed input is detected. Other such configurations are possible.

Upon receipt by the system component(s) 104, the audio data 1206 may be sent to an orchestrator component 1212 and/or the LLM orchestrator component 812. The orchestrator component 1212 may include memory and logic that enables the orchestrator component 1212 to transmit various pieces and forms of data to various components of the system, as well as perform other operations as described herein. In some embodiments, the orchestrator component 1212 may optionally be included in the system component(s) 104. In embodiments where the orchestrator component 1212 is not included in the system component(s) 104, the audio data 1206 may be sent directly to the LLM orchestrator component 812. Further, in such embodiments, each of the components of the system component(s) 104 may be configured to interact with the LLM orchestrator component 812, the action plan execution component 816, and/or the API provider component.

In some embodiments, the system component(s) 104 may include an arbitrator component 1214, which may be configured to determine whether the orchestrator component 1212 and/or the LLM orchestrator component 812 are to process with respect to the audio data 1206. In some embodiments, the LLM orchestrator component 812 may be selected to process with respect to the audio data 1206 only if the user 802 associated with the audio data 1206 (or the user device 102 that captured the audio 1202) has previously indicated that the LLM orchestrator component 812 may be selected to process with respect to user inputs received from the user 802.

In some embodiments, the arbitrator component 1214 may determine the orchestrator component 1212 and/or the LLM orchestrator component 812 are to process with respect to the audio data 1206 based on metadata associated with the audio data 1206. For example, the arbitrator component 1214 may be a classifier configured to process a natural language representation of the audio data 1206 (e.g., output by the ASR component 136) and classify the corresponding user input as to be processed by the orchestrator component 1212 and/or the LLM orchestrator component 812. For further example, the arbitrator component 1214 may determine whether the device from which the audio data 1206 is received is associated with an indicator representing the audio data 1206 is to be processed by the orchestrator component 1212 and/or the LLM orchestrator component 812. As an even further example, the arbitrator component 1214 may determine whether the user (e.g., determined using data output from the user recognition component 1216) from which the audio data 1206 is received is associated with a user profile including an indicator representing the audio data 1206 is to be processed by the orchestrator component 1212 and/or the LLM orchestrator component 812. As another example, the arbitrator component 1214 may determine whether the audio data 1206 (or the output of the ASR component 136) corresponds to a request representing that the audio data 1206 is to be processed by the orchestrator component 1212 and/or the LLM orchestrator component 812 (e.g., a request including "let's chat" may represent that the audio data 1206 is to be processed by the LLM orchestrator component 812).

In some embodiments, if the arbitrator component 1214 is unsure (e.g., a confidence score corresponding to whether the orchestrator component 1212 and/or the LLM orchestrator component 812 is to process is below a threshold), then the arbitrator component 1214 may send the audio data 1206 to both of the orchestrator component 1212 and the LLM orchestrator component 812. In such embodiments, the orchestrator component 1212 and/or the LLM orchestrator component 812 may include further logic for determining further confidence scores during processing representing whether the orchestrator component 1212 and/or the LLM orchestrator component 812 should continue processing, as is discussed further herein below:

The arbitrator component 1214 may send the audio data 1206 to an ASR component 136. In some embodiments, the component selected to process the audio data 1206 (e.g., the orchestrator component 1212 and/or the LLM orchestrator component 812) may send the audio data 1206 to the ASR component 136. The ASR component 136 may transcribe the audio data 1206 into text data. The text data output by the ASR component 136 represents one or more than one (e.g., in the form of an N-best list) ASR hypotheses representing speech represented in the audio data 1206. The ASR component 136 interprets the speech in the audio data 1206 based on a similarity between the audio data 1206 and pre-established language models. For example, the ASR component 136 may compare the audio data 1206 with models for sounds (e.g., acoustic units such as phonemes, senons, phones, etc.) and sequences of sounds to identify words that match the sequence of sounds of the speech represented in the audio data 1206. The ASR component 136 sends the text data generated thereby to the arbitrator component 1214, the orchestrator component 1212, and/or the LLM orchestrator component 812. In instances where the text data is sent to the arbitrator component 1214, the arbitrator component 1214 may send the text data to the component selected to process the audio data 1206 (e.g., the orchestrator component 1212 and/or the LLM orchestrator component 812). The text data sent from the ASR component 136 to the arbitrator component 1214, the orchestrator component 1212, and/or the LLM orchestrator component 812 may include a single top-scoring ASR hypothesis or may include an N-best list including multiple top-scoring ASR hypotheses. An N-best list may additionally include a respective score associated with each ASR hypothesis represented therein.

A skill system component(s) 1250 may communicate with a skill component(s) 1222 within the system component(s) 104 directly with the orchestrator component 1212 and/or the action plan execution component 816, or with other components. A skill system component(s) 1250 may be configured to perform one or more actions. An ability to perform such action(s) may sometimes be referred to as a "skill." That is, a skill may enable a skill system component(s) 1250 to execute specific functionality in order to provide data or perform some other action requested by a user. For example, a weather service skill may enable a skill system component(s) 1250 to provide weather information to the system component(s) 104, a car service skill may enable a skill system component(s) 1250 to book a trip with respect to a taxi or ride sharing service, an order pizza skill may enable a skill system component(s) 1250 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 104 may be configured with a skill component 1222 dedicated to interacting with the skill system component(s) 1250. Unless expressly stated otherwise, reference to a skill, skill device, or skill component may include a skill component 1222 operated by the system component(s) 104 and/or skill operated by the skill system component(s) 1250. Moreover, the functionality described herein as a skill or skill may be referred to using many different terms, such as an action, bot, app, or the like. The skill component 1222 and or skill system component(s) 1250 may return output data to the orchestrator component 1212.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 824. The TTS component 824 may generate audio data (e.g., synthesized speech) from text data using one or more different methods. Text data input to the TTS component 824 may come from a skill component 1222, the orchestrator component 1212, or another component of the system. In one method of synthesis called unit selection, the TTS component 824 matches text data against a database of recorded speech. The TTS component 824 selects matching units of recorded speech and concatenates the units together to form audio data. In another method of synthesis called parametric synthesis, the TTS component 824 varies parameters such as frequency, volume, and noise to create audio data including an artificial speech waveform. Parametric synthesis uses a computerized voice generator, sometimes called a vocoder.

The user device 102 may include still image and/or video capture components such as a camera or cameras to capture one or more images. The user device 102 may include circuitry for digitizing the images and/or video for transmission to the system component(s) 104 as image data. The user device 102 may further include circuitry for voice command-based control of the camera, allowing a user 802 to request capture of image or video data. The user device 102 may process the commands locally or send audio data 1206 representing the commands to the system component(s) 104 for processing, after which the system component(s) 104 may return output data that can cause the user device 102 to engage its camera.

The system component(s) 104/the user device 102 may include a user recognition component 1216 that recognizes one or more users using a variety of data. However, the disclosure is not limited thereto, and the user device 102 may include the user recognition component 1216 instead of and/or in addition to the system component(s) 104 without departing from the disclosure.

The user recognition component 1216 may take as input the audio data 1206 and/or text data output by the ASR component 136. The user recognition component 1216 may perform user recognition by comparing audio characteristics in the audio data 1206 to stored audio characteristics of users. The user recognition component 1216 may also perform user recognition by comparing biometric data (e.g., fingerprint data, iris data, etc.), received by the system in correlation with the present user input, to stored biometric data of users assuming user permission and previous authorization. The user recognition component 1216 may further perform user recognition by comparing image data (e.g., including a representation of at least a feature of a user), received by the system in correlation with the present user input, with stored image data including representations of features of different users. The user recognition component 1216 may perform additional user recognition processes, including those known in the art.

The user recognition component 1216 determines scores indicating whether user input originated from a particular user. For example, a first score may indicate a likelihood that the user input originated from a first user, a second score may indicate a likelihood that the user input originated from a second user, etc. The user recognition component 1216 also determines an overall confidence regarding the accuracy of user recognition operations.

Output of the user recognition component 1216 may include a single user identifier corresponding to the most likely user that originated the user input. Alternatively, output of the user recognition component 1216 may include an N-best list of user identifiers with respective scores indicating likelihoods of respective users originating the user input. The output of the user recognition component 1216 may be used to inform processing of the arbitrator component 1214, the orchestrator component 1212, and/or the LLM orchestrator component 812 as well as processing performed by other components of the system.

The system component(s) 104/user device 102 may include a presence detection component that determines the presence and/or location of one or more users using a variety of data.

The system 800 (either on user device 102, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.: input and output capabilities of the device: internet connectivity information: user bibliographic information: subscription information, as well as other information.

The profile storage 1218 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 102, the user profile (associated with the presented login information) may be updated to include information about the user device 102, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1218 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1218 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 12 may be illustrated as part of system component(s) 104, user device 102, or otherwise, the components may be arranged in other device(s) (such as in user device 102 if illustrated in system component(s) 104 or vice-versa, or in other device(s) altogether) without departing from the disclosure.

In at least some embodiments, the system component(s) may receive the audio data 1206 from the user device 102, to recognize speech corresponding to a spoken input in the received audio data 1206, and to perform functions in response to the recognized speech. In at least some embodiments, these functions involve sending directives (e.g., commands), from the system component(s) to the user device 102 (and/or other devices) to cause the user device 102 to perform an action, such as output an audible response to the spoken input via a loudspeaker(s), and/or control secondary devices in the environment by sending a control command to the secondary devices.

Thus, when the user device 102 is able to communicate with the system component(s) over the networks(s) 106, some or all of the functions capable of being performed by the system component(s) may be performed by sending one or more directives over the networks(s) 106 to the user device 102, which, in turn, may process the directive(s) and perform one or more corresponding actions. For example, the system component(s), using a remote directive that is included in response data (e.g., a remote response), may instruct the user device 102 to output an audible response (e.g., using TTS processing performed by an on-device TTS component) to a user's question via a loudspeaker(s) of (or otherwise associated with) the user device 102, to output content (e.g., music) via the loudspeaker(s) of (or otherwise associated with) the user device 102, to display content on a display of (or otherwise associated with) the user device 102, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 802 as part of a shopping function, establishing a communication session (e.g., a video call) between the user 802 and another user, and so on.

In at least some embodiments, a hybrid selector, of the user device 102, may send the audio data 1206 to the wakeword detection component 1204. If the wakeword detection component 1204 detects a wakeword in the audio data 1206, the wakeword detection component 1204 may send an indication of such detection to the hybrid selector. In response to receiving the indication, the hybrid selector may send the audio data 1206 to the system component(s) and/or the ASR component of the user device 102. The wakeword detection component 1204 may also send an indication, to the hybrid selector, representing a wake-word was not detected. In response to receiving such an indication, the hybrid selector may refrain from sending the audio data 1206 to the system component(s), and may prevent the ASR component of the user device 102 from further processing the audio data 1206. In this situation, the audio data 1206 can be discarded.

The user device 102 may conduct its own speech processing using on-device language processing components, such as an ASR component, similar to the manner discussed herein with respect to the ASR component 136 of the system component(s). The user device 102 may also internally include, or otherwise have access to, other components such as one or more skill components capable of executing commands based on the output of an orchestrator component, an LLM orchestrator, or other results determined by the user device 102/system component(s) (which may operate similarly to skill components 1222), an arbitrator component (configured to process in a similar manner to that discussed herein above with respect to the arbitrator component 1214), an action plan execution component (configured to process in a similar manner to that discussed herein with respect to the action plan execution component 816), a context handler component (configured to process in a similar manner to that discussed herein with respect to the context handler component 826), a user recognition component (configured to process in a similar manner to that discussed herein with respect to the user recognition component 1216 of the system component(s)), profile storage (configured to store similar profile data to that discussed herein with respect to the profile storage 1218 of the system component(s)), or other components. In at least some embodiments, the profile storage may only store profile data for a user or group of users specifically associated with the user device 102. Similar to as described above with respect to skill component 1222, a skill component of the user device 102 may communicate with a skill system component(s) 1250. The user device 102 may also have its own TTS component, which may operate similarly to TTS component 824.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 102 attempts to process a natural language user input for which the on-device language processing components are not necessarily best suited, the language processing results determined by the user device 102 may indicate a low confidence or other metric indicating that the processing by the user device 102 may not be as accurate as the processing done by the system component(s).

The hybrid selector, of the user device 102, may include a hybrid proxy (HP) configured to proxy traffic to/from the system component(s). For example, the HP may be configured to send messages to/from a hybrid execution controller (HEC) of the hybrid selector. For example, command/directive data received from the system component(s) can be sent to the HEC using the HP. The HP may also be configured to allow the audio data 1206 to pass to the system component(s) while also receiving (e.g., intercepting) this audio data 1206 and sending the audio data 1206 to the HEC.

In at least some embodiments, the hybrid selector may further include a local request orchestrator (LRO) configured to notify the ASR component of the user device 102 about the availability of new audio data 1206 that represents user speech, and to otherwise initiate the operations of local language processing when new audio data 1206 becomes available. In general, the hybrid selector may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 102 receives directive data from the system component(s) and chooses to use that remotely-determined directive data.

Thus, when the audio data 1206 is received, the HP may allow the audio data 1206 to pass through to the system component(s) and the HP may also input the audio data 1206 to the on-device ASR component by routing the audio data 1206 through the HEC of the hybrid selector, whereby the LRO notifies the on-device ASR component of the audio data 1206. At this point, the hybrid selector may wait for response data from either or both of the system component(s) or the local language processing components. However, the disclosure is not limited thereto, and in some examples the hybrid selector may send the audio data 1206 only to the local ASR component without departing from the disclosure. For example, the user device 102 may process the audio data 1206 locally without sending the audio data 1206 to the system component(s).

The local ASR component is configured to receive the audio data 1206 from the hybrid selector, and to recognize speech in the audio data 1206. The user device 102 and/or the system component(s) may associate a unique identifier with each natural language user input. The user device 102 may include the unique identifier when sending the audio data 1206 to the system component(s), and the response data from the system component(s) may include the unique identifier to identify which natural language user input the response data corresponds.

In at least some embodiments, the user device 102 may include, or be configured to use, one or more skill components that may work similarly to the skill component(s) 1222 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 102 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 102 may be in communication with one or more skill system component(s) 1250. For example, a skill system component(s) 1250 may be located in a remote environment (e.g., separate location) such that the user device 102 may only communicate with the skill system component(s) 1250 via the networks(s) 106. However, the disclosure is not limited thereto. For example, in at least some embodiments, a skill system component(s) 1250 may be configured in a local environment (e.g., home server and/or the like) such that the user device 102 may communicate with the skill system component(s) 1250 via a private network, such as a local area network (LAN).

A skill system component(s) 1250 may communicate with a skill component(s) 822 within the system component(s) 104 directly with the orchestrator component 1212 and/or the action plan execution component 816, or with other components. A skill system component(s) 1250 may be configured to perform one or more actions. An ability to perform such action(s) may sometimes be referred to as a "skill." That is, a skill may enable a skill system component(s) 1250 to execute specific functionality in order to provide data or perform some other action requested by a user. For example, a weather service skill may enable a skill system component(s) 1250 to provide weather information to the system component(s) 104, a car service skill may enable a skill system component(s) 1250 to book a trip with respect to a taxi or ride sharing service, an order pizza skill may enable a skill system component(s) 1250 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 104 may be configured with a skill component 822 dedicated to interacting with the skill system component(s) 1250. Unless expressly stated otherwise, reference to a skill, skill device, or skill component may include a skill component 822 operated by the system component(s) 104 and/or skill operated by the skill system component(s) 1250. Moreover, the functionality described herein as a skill or skill may be referred to using many different terms, such as an action, bot, app, or the like. The skill component 822 and or skill system component(s) 1250 may return output data to the orchestrator component 1212.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 824. The TTS component 824 may generate audio data (e.g., synthesized speech) from text data using one or more different methods. Text data input to the TTS component 824 may come from a skill component 822, the orchestrator component 1212, or another component of the system. In one method of synthesis called unit selection, the TTS component 824 matches text data against a database of recorded speech. The TTS component 824 selects matching units of recorded speech and concatenates the units together to form audio data. In another method of synthesis called parametric synthesis, the TTS component 824 varies parameters such as frequency, volume, and noise to create audio data including an artificial speech waveform. Parametric synthesis uses a computerized voice generator, sometimes called a vocoder.

The user device 102 may include still image and/or video capture components such as a camera or cameras to capture one or more images. The user device 102 may include circuitry for digitizing the images and/or video for transmission to the system component(s) 104 as image data. The user device 102 may further include circuitry for voice command-based control of the camera, allowing a user 802 to request capture of image or video data. The user device 102 may process the commands locally or send audio data 1206 representing the commands to the system component(s) 104 for processing, after which the system component(s) 104 may return output data that can cause the user device 102 to engage its camera.

The system component(s) 104 may include a user recognition component 1216 that recognizes one or more users using a variety of data. The user recognition component 1216 may take as input the audio data 1206 and/or text data output by the ASR component 136. The user recognition component 1216 may perform user recognition by comparing audio characteristics in the audio data 1206 to stored audio characteristics of users. The user recognition component 1216 may also perform user recognition by comparing biometric data (e.g., fingerprint data, iris data, etc.), received by the system in correlation with the present user input, to stored biometric data of users assuming user permission and previous authorization. The user recognition component 1216 may further perform user recognition by comparing image data (e.g., including a representation of at least a feature of a user), received by the system in correlation with the present user input, with stored image data including representations of features of different users. The user recognition component 1216 may perform additional user recognition processes, including those known in the art.

The user recognition component 1216 determines scores indicating whether user input originated from a particular user. For example, a first score may indicate a likelihood that the user input originated from a first user, a second score may indicate a likelihood that the user input originated from a second user, etc. The user recognition component 1216 also determines an overall confidence regarding the accuracy of user recognition operations.

Output of the user recognition component 1216 may include a single user identifier corresponding to the most likely user that originated the user input. Alternatively, output of the user recognition component 1216 may include an N-best list of user identifiers with respective scores indicating likelihoods of respective users originating the user input. The output of the user recognition component 1216 may be used to inform processing of the arbitrator component 1214, the orchestrator component 1212, and/or the LLM orchestrator component 812 as well as processing performed by other components of the system.

The system component(s) 104/user device 102 may include a presence detection component that determines the presence and/or location of one or more users using a variety of data.

The system 800 (either on user device 102, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.: input and output capabilities of the device: internet connectivity information: user bibliographic information: subscription information, as well as other information.

The profile storage 1218 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 102, the user profile (associated with the presented login information) may be updated to include information about the user device 102, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1218 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1218 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 12 may be illustrated as part of system component(s) 104, user device 102, or otherwise, the components may be arranged in other device(s) (such as in user device 102 if illustrated in system component(s) 104 or vice-versa, or in other device(s) altogether) without departing from the disclosure.

In at least some embodiments, the system component(s) may receive the audio data 1206 from the user device 102, to recognize speech corresponding to a spoken input in the received audio data 1206, and to perform functions in response to the recognized speech. In at least some embodiments, these functions involve sending directives (e.g., commands), from the system component(s) to the user device 102 (and/or other user devices) to cause the user device 102 to perform an action, such as output an audible response to the spoken input via a loudspeaker(s), and/or control secondary devices in the environment by sending a control command to the secondary devices.

Thus, when the user device 102 is able to communicate with the system component(s) over the networks(s) 106, some or all of the functions capable of being performed by the system component(s) may be performed by sending one or more directives over the networks(s) 106 to the user device 102, which, in turn, may process the directive(s) and perform one or more corresponding actions. For example, the system component(s), using a remote directive that is included in response data (e.g., a remote response), may instruct the user device 102 to output an audible response (e.g., using TTS processing performed by an on-device TTS component) to a user's question via a loudspeaker(s) of (or otherwise associated with) the user device 102, to output content (e.g., music) via the loudspeaker(s) of (or otherwise associated with) the user device 102, to display content on a display of (or otherwise associated with) the user device 102, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 802 as part of a shopping function, establishing a communication session (e.g., a video call) between the user 802 and another user, and so on.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
   one or more processors; and
   non-transitory computer-readable media storing computer-executable instructions that, when executed by the one or more processors, cause the one or more processors to perform operations comprising:
      receiving audio data representing a voice command associated with user account data;
      generating a first embedding of text representing the voice command:
      generating, utilizing a translation model trained to output embeddings that associate voice commands with device names and utilizing the first embedding as input to the translation model, a second embedding of the voice command, wherein the second embedding differs from the first embedding and indicates an association between the voice command and device naming;
      determining reference embeddings associated with the user account data, wherein individual ones of the reference embeddings represent at least a device name associated with the user account data;
      determining a subset of the reference embeddings that have at least a threshold degree of similarity to the second embedding; and
      sending, to a large language model (LLM) configured to determine a response to the voice command, first data for a subset of devices that correspond to the subset of the reference embeddings, the first data configured to be utilized by the LLM to select which of the subset of devices is to perform an action responsive to the voice command.

2. The system of claim 1, the operations further comprising:
   generating a first dataset including utterance embeddings indicating prior voice commands:
   generating a second dataset including the reference embeddings:
   generating, utilizing contrastive learning processes, a training dataset that associates the utterance embeddings with the reference embeddings; and
   training the translation model utilizing the training dataset.

3. The system of claim 1, the operations further comprising:
   determining, for a reference embedding of the reference embeddings and from the user account data, the device name:
   determining, from the user account data, one or more functionalities of a device associated with the device name, wherein the one or more functionalities indicate actions that the device is configured to perform; and
   generating the reference embedding from the device name and the one or more functionalities.

4. The system of claim 1, the operations further comprising:
   determining application programming interface (API) call embeddings associated with API calls configured to be made during speech processing of the voice command;
   determining an API call embedding of the API call embeddings that is most similar to the second embedding;
   selecting, from the API call embedding being most similar to the second embedding, an API call associated with the API call embedding; and
   sending, to the LLM and in addition to the first data, second data identifying the API call that the LLM may utilize for accessing information for determining the response to the voice command.

5. A method, comprising:
   receiving user input data representing a request associated with user account data;
   generating a first embedding of text data representing the user input data;
   generating, utilizing a translation model trained to associate user input with device names and based at least in part on the first embedding, a second embedding that differs at least in part from the first embedding;
   determining reference embeddings associated with the user account data, wherein individual ones of the reference embeddings correspond to a device associated with the user account data;
   determining a subset of the reference embeddings that satisfy a threshold similarity to the second embedding; and
   sending, to a large language model (LLM) configured to determine a response to the user input data, first data for a subset of devices that correspond to the subset of the reference embeddings.

6. The method of claim 5, further comprising:
   generating input embeddings indicating prior user input data;
   generating the reference embeddings indicating reference devices;

generating a training dataset that associates the input embeddings with the reference embeddings; and training the translation model based at least in part on the training dataset.

7. The method of claim 5, further comprising:

determining, for a reference embedding of the reference embeddings, a device name of the device;

determining contextual data associated with the device; and generating the reference embedding based at least in part on the device name and the contextual data.

8. The method of claim 5, further comprising:

determining application programming interface (API) call embeddings associated with API calls configured to be made by the LLM;

determining an API call embedding of the API call embeddings that is associated with the second embedding;

selecting, based at least in part on the API call embedding being associated with the second embedding, an API call associated with the API call embedding; and sending, to the LLM, second data identifying the API call.

9. The method of claim 5, further comprising:

storing prior user input embeddings in an embedding space, wherein individual ones of the prior user input embeddings are associated with a prior user input; and determining a prior user input embedding that is nearest the second embedding in the embedding space, and wherein determining the subset of the reference embeddings comprises determining the subset of the reference embeddings that satisfy the threshold similarity to the prior user input embedding.

10. The method of claim 5, further comprising:

storing second data representing an embedding space with prior user input embeddings;

determining a group of the prior user input embeddings that are associated with a device name embedding in the embedding space;

determining that a first prior user input embedding in the group of the prior user input embeddings has at least a threshold degree of similarity to a second prior user input embedding in the group of the prior user input embeddings; and causing at least one of the first prior user input embedding or the second prior user input embedding to be removed from the embedding space.

11. The method of claim 5, further comprising:

storing second data representing an embedding space with prior user input embeddings and the reference embeddings;

determining that the LLM inaccurately responded to sample user input;

receiving feedback data indicating an accurate response to the sample user input; and training the translation model such that a location in the embedding space of a sample user input embedding corresponding to the sample user input is modified to be nearer a reference embedding associated with the accurate response.

12. The method of claim 5, further comprising:

determining, based at least in part on the user input data being associated with the user account data, a number of devices associated with the user account data; and determining that the number of devices satisfies a threshold number of devices predetermined to be more than the LLM can utilize as input, and wherein generating the first embedding comprises generating the first embedding based at least in part on the number of devices satisfying the threshold number of devices.

13. A system, comprising:

one or more processors; and non-transitory computer-readable media storing computer-executable instructions that, when executed by the one or more processors, cause the one or more processors to perform operations comprising:

receiving user input data representing a voice command associated with user account data;

generating a first embedding of text data representing the user input data:

generating, utilizing a translation model trained to associate voice commands with device names, a second embedding that differs at least in part from the first embedding;

determining reference embeddings associated with the user account data, wherein individual ones of the reference embeddings correspond to attributes of a device associated with the user account data;

determining a subset of the reference embeddings that satisfy a threshold similarity to the second embedding; and sending, to components of a speech processing system configured to determine a response to the user input data, first data associated with a subset of devices that correspond to the subset of the reference embeddings.

14. The system of claim 13, the operations further comprising:

generating a training dataset that associates input embeddings of prior user input data with the reference embeddings indicating reference devices; and training the translation model based at least in part on the training dataset.

15. The system of claim 13, the operations further comprising:

determining, for a reference embedding of the reference embeddings, a device name of the device;

determining a device type associated with the device; and generating the reference embedding based at least in part on the device name and the device type.

16. The system of claim 13, the operations further comprising:

determining application programming interface (API) call embeddings associated with API calls configured to be made by the components of the speech processing system;

determining an API call embedding of the API call embeddings that is associated with the second embedding; and selecting an API call associated with the API call embedding for use when responding to the voice command.

17. The system of claim 13, the operations further comprising:

generating an embedding space with prior user input embeddings, wherein individual ones of the prior user input embeddings are associated with a prior user input; and identifying characteristics of the voice command based at least in part on a prior user input embedding that is nearest the second embedding in the embedding space.

18. The system of claim 13, the operations further comprising:

generating an embedding space with prior user input embeddings;

determining a group of the prior user input embeddings that are associated with performance of an action by a given device;

determining that a first prior user input embedding in the group of the prior user input embeddings has at least a threshold degree of similarity to a second prior user input embedding in the group of the prior user input embeddings; and causing at least one of the first prior user input embedding or the second prior user input embedding to be dissociated from the embedding space.

19. The system of claim 13, the operations further comprising:

generating an embedding space with prior user input embeddings and the reference embeddings;

determining that the components of the speech processing system inaccurately responded to sample user input;

receiving second data indicating an accurate response to the sample user input; and training the translation model based at least in part on the second data.

20. The system of claim 13, the operations further comprising:

determining a number of devices associated with the user account data; and determining that the number of devices satisfies a threshold number of devices, and wherein generating the first embedding comprises generating the first embedding based at least in part on the number of devices satisfying the threshold number of devices.

* * * * *